US008232345B2

(12) United States Patent
Farwaha et al.

(10) Patent No.: US 8,232,345 B2
(45) Date of Patent: Jul. 31, 2012

(54) METHOD OF MAKING SALT-SENSITIVE BINDERS AND NONWOVEN WEBS

(75) Inventors: Rajeev Farwaha, Belle Mead, NJ (US); Steven P. Pauls, Sr., Old Bridge, NJ (US); Pavneet S. Mumick, Belle Mead, NJ (US); James L. Walker, Whitehouse Station, NJ (US)

(73) Assignee: Celanese International Corporation, Dallas, TX (US)

( * ) Notice: Subject to any disclaimer, the term of this patent is extended or adjusted under 35 U.S.C. 154(b) by 0 days.

(21) Appl. No.: 12/932,290

(22) Filed: Feb. 23, 2011

(65) Prior Publication Data
US 2011/0146927 A1   Jun. 23, 2011

Related U.S. Application Data

(62) Division of application No. 11/339,216, filed on Jan. 25, 2006, now Pat. No. 7,989,545.

(51) Int. Cl.
*C08L 33/00* (2006.01)

(52) U.S. Cl. ..................... 524/556; 525/330

(58) Field of Classification Search ............. 524/556; 525/330.2
See application file for complete search history.

(56) References Cited

U.S. PATENT DOCUMENTS

| 3,035,004 A | 5/1962 | Glavis ..................... 260/29.7 |
| 2,726,230 A | 12/1965 | Carlson ..................... 260/86.1 |
| 3,248,356 A | 4/1966 | Snyder ..................... 260/29.6 |
| 3,649,581 A | 3/1972 | Mast et al. ..................... 260/29.6 |
| 3,677,991 A | 7/1972 | Moore ..................... 260/29.6 |
| 3,939,836 A | 2/1976 | Tunc ..................... 128/284 |
| 4,005,251 A | 1/1977 | Tunc ..................... 536/59 |
| 4,110,291 A | 8/1978 | Barabas et al. ..................... 260/29.6 |
| 4,151,143 A | 4/1979 | Blank et al. ..................... 260/29.6 |
| 4,242,408 A | 12/1980 | Evani et al. ..................... 428/290 |
| 4,309,469 A | 1/1982 | Varona ..................... 428/74 |
| 4,384,096 A | 5/1983 | Sonnabend ..................... 526/313 |
| 4,423,199 A | 12/1983 | Chang et al. ..................... 526/307.6 |
| 4,769,167 A | 9/1988 | Haas et al. ..................... 252/76 |
| 4,801,671 A | 1/1989 | Shay et al. ..................... 526/214 |
| 5,053,448 A | 10/1991 | Tsaur ..................... 524/460 |
| 5,073,591 A | 12/1991 | Tsaur ..................... 524/460 |
| 5,082,896 A | 1/1992 | Chan ..................... 524/823 |
| 5,252,332 A | 10/1993 | Goldstein ..................... 424/402 |
| 5,312,883 A | 5/1994 | Komatsu et al. ..................... 526/318.44 |
| 5,317,063 A | 5/1994 | Komatsu et al. ..................... 525/330.2 |
| 5,332,854 A | 7/1994 | Yokota et al. ..................... 558/33 |
| 5,384,189 A | 1/1995 | Kuroda et al. ..................... 428/288 |
| 5,500,281 A | 3/1996 | Srinivasan et al. ..................... 428/288 |
| 5,509,913 A | 4/1996 | Yeo ..................... 604/364 |
| 5,631,317 A | 5/1997 | Komatsu et al. ..................... 524/561 |
| 5,656,746 A | 8/1997 | Smith et al. ..................... 536/63 |
| 5,739,196 A | 4/1998 | Jenkins et al. ..................... 524/460 |
| 5,935,880 A | 8/1999 | Wang et al. ..................... 442/65 |
| 5,972,805 A | 10/1999 | Pomplun et al. ..................... 442/59 |
| 5,986,004 A | 11/1999 | Pomplun et al. ..................... 525/176 |
| 6,043,317 A | 3/2000 | Mumick et al. ..................... 525/176 |
| 6,063,857 A | 5/2000 | Greenblatt et al. ..................... 524/561 |
| 6,127,593 A | 10/2000 | Bjorkquist et al. ..................... 604/364 |
| 6,194,517 B1 | 2/2001 | Pomplun et al. ..................... 525/176 |
| 6,291,372 B1 | 9/2001 | Mumick et al. ..................... 442/102 |
| 6,423,804 B1 | 7/2002 | Chang et al. ..................... 526/319 |
| 6,429,261 B1 | 8/2002 | Lang et al. ..................... 525/191 |
| 6,433,245 B1 | 8/2002 | Bjorkquist et al. ..................... 604/364 |
| 6,537,663 B1 | 3/2003 | Chang et al. ..................... 428/394 |
| 6,548,592 B1 | 4/2003 | Lang et al. ..................... 524/401 |
| 6,579,570 B1 | 6/2003 | Lang et al. ..................... 427/421 |
| 6,599,848 B1 | 7/2003 | Chen et al. ..................... 442/59 |
| 6,602,955 B2 | 8/2003 | Soerens et al. ..................... 525/91 |
| 6,630,558 B2 | 10/2003 | Chang et al. ..................... 526/319 |
| 6,653,406 B1 | 11/2003 | Soerens et al. ..................... 525/212 |
| 6,683,129 B1 | 1/2004 | Eknoian ..................... 524/547 |
| 6,683,143 B1 | 1/2004 | Mumick et al. ..................... 526/240 |
| 6,713,414 B1 | 3/2004 | Pomplun et al. ..................... 442/327 |
| 6,762,239 B1 | 7/2004 | Williams ..................... 524/547 |
| 6,815,502 B1 | 11/2004 | Lang et al. ..................... 525/191 |
| 6,835,678 B2 | 12/2004 | Jackson et al. ..................... 442/154 |
| 6,855,790 B2 | 2/2005 | Chang et al. ..................... 526/319 |
| 6,897,168 B2 | 5/2005 | Branham et al. ..................... 442/59 |
| 6,908,966 B2 | 6/2005 | Chang et al. ..................... 525/217 |
| 7,056,847 B2 | 6/2006 | Walker et al. ..................... 442/155 |
| 7,173,085 B2 | 2/2007 | Eknoian ..................... 524/547 |
| 7,276,459 B1 | 10/2007 | Lang et al. ..................... 442/327 |
| 7,320,831 B2 | 1/2008 | Farwaha et al. ..................... 428/507 |
| 7,329,705 B2 | 2/2008 | Farwaha et al. ..................... 524/556 |
| 2002/0155281 A1 | 10/2002 | Lang et al. ..................... 428/337 |
| 2002/0187270 A1* | 12/2002 | Goldstein et al. ..................... 427/385.5 |
| 2003/0008591 A1 | 1/2003 | Parsons et al. ..................... 442/414 |
| 2003/0032352 A1 | 2/2003 | Chang et al. ..................... 442/102 |
| 2003/0096910 A1 | 5/2003 | Soerens et al. ..................... 525/191 |
| 2003/0164476 A1 | 9/2003 | Guo et al. ..................... 252/543 |
| 2003/0220042 A1 | 11/2003 | Lostocco et al. ..................... 442/543 |
| 2004/0018952 A1 | 1/2004 | Gray et al. ..................... 510/543 |
| 2004/0030034 A1 | 2/2004 | Chang et al. ..................... 524/543 |
| 2004/0030080 A1 | 2/2004 | Chang et al. ..................... 526/318.44 |
| 2004/0034138 A1 | 2/2004 | Byuscall et al. ..................... 524/377 |
| 2004/0055704 A1 | 3/2004 | Bunyard et al. ..................... 156/305 |
| 2004/0058600 A1 | 3/2004 | Bunyard et al. ..................... 442/59 |
| 2004/0058606 A1 | 3/2004 | Branham et al. ..................... 442/327 |
| 2004/0062791 A1 | 4/2004 | Branham et al. ..................... 424/443 |
| 2004/0063888 A1 | 4/2004 | Bunyard et al. ..................... 526/310 |
| 2004/0110891 A1 | 6/2004 | Guo et al. ..................... 524/522 |
| 2004/0151886 A1 | 8/2004 | Bobsein et al. ..................... 428/211.1 |
| 2004/0186222 A1 | 9/2004 | Eknoian ..................... 524/556 |
| 2004/0198114 A1 | 10/2004 | Barnholtz et al. ..................... 442/1 |

FOREIGN PATENT DOCUMENTS

EP   0 582 123   2/1994

(Continued)

*Primary Examiner* — Robert D. Harlan
(74) *Attorney, Agent, or Firm* — Michael W. Ferrell, Esq.

(57) ABSTRACT

A solution with a salt-sensitive polymer binder for use in fibrous webs, where the binder contains a copolymer of carboxylic acid monomer units and ethylenically unsaturated monomer units. The binder solution is prepared by emulsion-polymerizing a copolymer and then neutralizing the copolymer with base to make it water soluble. The binders provide a higher wet strength in concentrated salt solutions than in deionized water, and are particularly suitable for strengthening nonwoven fibrous webs in disposable articles such as wet-wipes, personal care products, diapers, and the like.

16 Claims, 4 Drawing Sheets

| | FOREIGN PATENT DOCUMENTS | |
|---|---|---|
| EP | 0 608 460 | 8/1994 |
| EP | 0 646 606 | 4/1995 |
| EP | 0 931 795 | 7/1999 |
| EP | 1 034 331 | 9/2000 |
| EP | 1 093 478 | 4/2001 |
| EP | 1 209 210 | 5/2002 |
| GB | 1 451 619 | 10/1976 |
| WO | 99/27186 | 6/1999 |
| WO | 99/65958 | 12/1999 |
| WO | WO 99/65958 | * 12/1999 |
| WO | 00/38750 | 7/2000 |
| WO | 00/39378 | 7/2000 |
| WO | 01/74941 | 10/2001 |
| WO | 01/83666 | 11/2001 |
| WO | 02/077048 | 10/2002 |
| WO | 03/005874 | 1/2003 |
| WO | 03/022318 | 3/2003 |
| WO | 03/099886 | 12/2003 |

* cited by examiner

METHOD OF MAKING SALT-SENSITIVE BINDERS AND NONWOVEN WEBS

CLAIM FOR PRIORITY

This application is a divisional of U.S. patent application Ser. No. 11/339,216, filed Jan. 25, 2006 and entitled "Salt-Sensitive Binders For Nonwoven Webs and Method of Making Same", now U.S. Pat. No. 7,989,545. The priority of U.S. patent application Ser. No. 11/339,216 is hereby claimed and its disclosure is incorporated herein in its entirety.

TECHNICAL FIELD

The present invention relates generally to salt-sensitive binders for nonwoven webs, and more particularly to water-soluble binder compositions which are converted from emulsion polymers. Methacrylic acid/alkyl acrylate/hydrophobic monomer terpolymers are preferred.

BACKGROUND

Wet strength is a desirable attribute for many disposable paper products that are required to maintain their wet integrity for an extended period of time prior to and during their intended use. Such products include toilet tissue, diapers, personal care products, and pre-moistened articles such as baby wipes and household cleaning wipes.

Permanent wet strength, however, is often an unnecessary and undesirable characteristic in paper products. Many paper products are disposed of after brief periods of use into landfills, incinerators, etc. which is inconvenient and can pose a significant burden on the solid waste stream. It is therefore preferable in many cases to direct used paper products to municipal sewage treatment facilities or private septic systems. Unfortunately, this procedure is often not available if the product is "unflushable." Clogging of sewage and septic systems can result if the product permanently retains hydrolysis-resistant strength properties. To address this problem, efforts have been undertaken to make binders that will provide paper products with sufficient "temporary" wet integrity in the presence of saline solutions, but minimal integrity when exposed to large amounts of waste water, such that they traverse plumbing and disintegrate in sewage and/or septic systems.

Specifically, it has been attempted to produce disposable fibrous products which maintain a relatively high wet strength in the presence of solutions with elevated ion concentrations, but become more dispersible when in contact with solutions having a lower ion concentration. These ion sensitive, water dispersible polymer formulations are well known in the art. There is disclosed for example, in U.S. Pat. No. 6,429,261 to Lang et al. a polymer formulation comprising a triggerable copolymer of acrylic acid, NaAMPS, butyl acrylate and 2-ethylhexyl acrylate as well as a non-crosslinkable co-binder emulsion polymer comprising poly(ethylene-vinyl acetate), wherein the polymer formulation is insoluble in a neutral salt solution containing at least about 1 weight percent salt and wherein the triggerable copolymer is soluble in water containing up to about 200 ppm of one or more multivalent ions. The polymers in Lang are typically prepared by solution polymerization.

U.S. Pat. No. 6,683,129 to Eknoian discloses salt sensitive binders in aqueous emulsions comprising methacrylic acid and acrylate monomers such as butyl acrylate and 2-ethylhexyl acrylate. The ion-sensitive binders are applied as emulsion compositions.

U.S. Pat. No. 6,291,372 of Mumick et al. discloses ion sensitive binders for fibrous material. A water soluble polymer binder is disclosed that includes about 25 to about 85 weight percent of unsaturated carboxylic acid ester terpolymer; as well as from about 5 weight percent to about 35 weight percent of a divalent ion inhibitor and from about 10 weight percent to about 60 weight percent of a hydrophilic cross-linkable emulsion polymer. The polymer binder is useful for binding absorbent webs of the class used in personal care products such as pre-moistened wipes.

U.S. Pat. No. 5,631,317 to Komatsu et al. discloses a process for producing a self-dispersing and salt-sensitive polymer. The formulations include a) from about 35 to about 65 weight percent of acrylic acid; b) from about 10 to about 45 weight percent of an acrylic ester such as 2-ethylhexyl (meth) acrylate or lauryl (meth)acrylate; and c) from about 20 to about 45 weight percent of a second acrylic ester such as ethyl (meth)acrylate, isopropyl (meth)acrylate, or n-butyl (meth) acrylate. The polymers in Komatsu are polymerized in a mixture of water and organic solvent, and the solvent is subsequently evaporated such that the binder is provided in an aqueous dispersion.

Still further references of interest with respect to salt sensitive binders include the following: U.S. Pat. Nos. 5,312,883 and 5,317,063 both to Komatsu et al. which disclose water soluble salt sensitive polymers; and U.S. Pat. Nos. 6,127,593 and 6,433,245, both to Bjorkquist et al. which disclose flushable fibrous structures.

Many of the references discussed above, such as Lang and Komatsu, produce ion sensitive binders by solution polymerization. Others, such as Eknoian, employ emulsion polymerization and provide the binders as emulsion compositions. These approaches are typical in salt-sensitive binder applications.

In contrast to the above procedures, emulsion polymers converted into water soluble polymers, whereby the emulsion polymer is put into solution by increasing the pH have not heretofore been used as salt-sensitive binders. Emulsion polymerized, alkali-solubilized polymers have been employed primarily in applications such as thickeners. Thickeners are added to aqueous systems to increase the viscosity to a desired level and are frequently added to materials such as paints, polishing and cleaning compositions, pharmaceuticals, among others.

U.S. Pat. No. 5,073,591 to Tsaur discloses a method for producing an alkali soluble emulsion polymer for use as a thickener. The method comprises emulsion-polymerizing in an aqueous media a polymer having an acidic moiety and an amino moiety. The emulsion polymerization occurs in acidic media and then the pH of the emulsion is raised to dissolve the polymer. Tsaur notes that when the pH of the emulsion is increased, the dispersed composition dissolves, and the viscosity rapidly increases.

U.S. Pat. No. 4,384,096 to Sonnabend discloses a liquid emulsion copolymer containing a carboxylic acid monomer, a monovinyl ester monomer, and a nonionic vinyl surfactant ester monomer. The emulsions are stable as dispersions in solutions with a pH below 5.0, but dissolve as the pH is increased. The dissolved emulsions are said to be useful as thickeners in applications such as latex paint.

Other references of interest include U.S. Pat. No. 6,063,857 to Greenblatt et al. which discloses a hydrophobically-modified alkali soluble emulsion polymer which is neutralized to at least 60% of its acidic groups. The polymer contains as the hydrophobic monomer, a surfactant ester. The polymers in Greenblatt may be used as thickening agents in paints, adhesives, nonwovens, textiles, etc. Likewise, United States Patent Application Publication No. 2004/0151886 to Bobsein et al. discloses a composition for paper coatings which contain 1) a binder copolymer and 2) a hydrophobically modified alkali-soluble emulsion polymer. U.S. Pat. No. 4,801,671 to Shay et al. discloses an alkali soluble copolymer containing a monomer with surfactant characteristics and a monomer with carboxyl functionality. Here again, the copolymers are used as thickeners. While the substantial increase in viscosity associated with water-soluble emulsion polymers is beneficial in thickening applications, it is an undesirable property in the field of nonwoven binders because the viscosity must be kept within processable limits.

Emulsion polymerization offers several advantages in the production of nonwoven binders. For example, emulsion polymerization is cost effective and environmentally safe, allowing for the production of a high-solids composition without the necessity of removing unwanted solvent. However, the present Applicants have observed that emulsion binders may not "trigger" as well as solution binders. "Triggering" is a critical mechanism in salt-sensitive applications whereby the polymer becomes insoluble in concentrated salt solutions, yet remains dispersible when in contact with solutions containing a lower concentration of ions. Also, the film-forming mechanism in emulsion polymers is different and less predictable than solution polymers. On the other hand, solution polymerization is disadvantaged from a processing standpoint because the solvent must be removed and the resulting compositions typically do not achieve as high of a solids content as can be produced with emulsion polymerization.

Thus, despite the contributions in salt-sensitive binders and products incorporating them, there still exists a need for high quality salt-sensitive binders which may be produced safely and efficiently.

SUMMARY OF INVENTION

It has been discovered in accordance with the present invention that superior binder solutions having salt-sensitive polymeric resins can be prepared by emulsion polymerizing the desired copolymer, and then neutralizing the emulsion composition to produce a water soluble polymer. Especially preferred are methacrylic acid (MAA) terpolymers, such as the methacrylic acid/butyl acrylate/isobornyl methacrylate polymers described in the examples below.

There is provided in one aspect of the present invention a method for producing a solution having a salt-sensitive binder for a nonwoven article, including the steps of:
  i) preparing an emulsion composition by emulsion polymerizing in an aqueous medium a copolymer resin which has from about 5 to about 80 wt. percent of carboxylic acid monomer units, and from about 10 to about 95 wt. percent of ethylenically unsaturated monomer units;
  ii) converting the emulsion composition into a solution by neutralizing the resin with base until it is water soluble; and
  iii) controlling the viscosity of the solution to be less than about 2,000 cps at 23° C.

The process may also include the step of diluting the emulsion composition to a solids level of from 10 to 35 percent prior to neutralization, and preferably to a level of from 15 to 25 percent. Desirably, the viscosity of the solution should be controlled to be less than 1,000 cps, and more preferably less than 500 cps, or less than 200 cps.

In another aspect of the present invention there is provided a method of making a nonwoven web with a polymeric binder, the method comprising the steps of i) preparing an emulsion composition by emulsion polymerizing in an aqueous medium, a copolymer resin having from about 5-80 wt. percent of carboxylic acid units and from about 10-95 percent of ethylenically unsaturated comonomer units; ii) converting the emulsion composition to a binder solution by neutralizing the resin with base until it is water soluble; iii) providing a fibrous web; and iv) applying the binder solution to the web, where the binder provides a characteristic wet strength index of less than 25 in deionized water, and a wet strength index elevation of at least 15 points in a 10 percent NaCl solution. Typically, the inventive method also includes the step of drying the fibrous web.

In yet another aspect of the invention, there is provided a salt-sensitive binder polymer comprising from about 10-70 wt. percent of methacrylic acid units, about 10-90 percent of alkyl acrylate units having from 2 to 4 carbon atoms in the alkyl moiety, and from about 2-55 wt. percent of hydrophobic monomer units selected from the group of alkyl (meth)acrylamides having from 4 to 12 carbon atoms in the alkyl moiety, straight chained or branched alkyl methacrylate units having from 4 to 6 carbon atoms in the alkyl moiety; bi-cycloalkyl (meth) acrylates with from 4 to 20 carbon atoms in the cycloalkyl moiety; and combinations thereof, where the binder polymer is neutralized such that it is water soluble.

The alkyl acrylate units suitably comprise butyl acrylate. In some embodiments, the hydrophobic monomer units include a substituted or unsubstituted bi-cycloalkyl (meth)acrylate with 6-14 carbon atoms in the cylcloalkyl moiety, e.g., isobornyl methacrylate. Other suitable hydrophobic monomer units include n-butyl methacrylate and alkyl (meth)acrylamides with 6-10 carbon atoms in the alkyl moiety, such as N-tertiary octyl acrylamide.

Also, the polymer desirably contains less than 5 wt. percent of straight or branched chain, i.e. non-cyclical, alkyl acrylate units with 8-12 carbon atoms in the alkyl moiety; the presence of less than 5 wt. % (or more preferably the absence) of ($C_8$-$C_{12}$) alkyl acrylates may be beneficial due to cost and processing considerations.

In still another embodiment of the present invention there is provided a salt-sensitive, aqueous binder solution for a nonwoven web comprising water and a water-solubilized resin composition that is converted from an emulsion polymer, where the composition includes i) a copolymer with from about 5-80 wt. percent of carboxylic acid units and from 10-95 wt. percent of ethylenically unsaturated comonomer units, and ii) an amount of emulsifier effective to maintain a stable emulsion during polymerization of the polymer. The binder provides a characteristic wet strength index of less than 25 in deionized water and a characteristic wet strength index elevation of at least 15 points in 10% NaCl.

The emulsifier is present in the binder solution in suitable amounts of from 0.05 to 10 wt. percent, or from 0.2 to 5 percent, of the total solids weight. Preferably the emulsifier includes one or more polymerizable surfactants that are polymerized into the backbone of the salt-sensitive resin. More preferably, the emulsifying agent consists of polymerizable surfactants.

The copolymer resin may have from about 20 to about 65 weight percent of carboxylic acid units. The carboxyl acid units are most preferably methacrylic acid; however, other carboxylic acid units may include beta-carboxy ethyl acrylate or a monoalkyl ester of maleic acid such as monoethyl maleate.

The copolymer desirably has from about 30 to about 70 weight percent of ethylenically unsaturated comonomer units. Exemplary comonomer units include alkyl acrylates with 1-4 carbon atoms in the alkyl moiety, such as butyl acrylate.

The ethylenically unsaturated monomer units may include hydrophobic monomer units which are selected from the group consisting of alkyl (meth)acrylamides having from 2 to 15 carbon atoms in the alkyl moiety, straight chained or branched alkyl methacrylate units having from 4 to 12 carbon atoms in the alkyl moiety; straight chained or branched alkyl acrylates having from 5 to 12 carbon atoms in the alkyl moiety; substituted or unsubstituted bi-cycloalkyl (meth) acrylates; and combinations thereof. The hydrophobic monomer units may be present in the copolymer in suitable amounts of from 2 to 55 wt. percent, and preferably from 3 to 20 weight percent.

The ethylenically unsaturated monomer units may also include hardening monomer units in preferred amounts of from 2 to 55 wt. percent, or from 10 to 50 wt. percent. The hardening monomer generally has a glass transition temperature in the range of from 40° C. to 140° C., and preferably from 80° C. to 120° C. The hardening monomer used in the invention is usually methyl methacrylate.

The salt-sensitive resin preferably has less than 0.25 percent of cross-linkable monomers, the presence of which may adversely affect the dispersibility properties of the binder.

The copolymer employed in the invention generally has a molecular weight of from 40,000 to 400,000 g/mol and more typically from 60,000 to 250,000 g/mol.

The copolymer in the inventive binder solution is preferably solubilized at least to the point where it reaches its maximum optical transparence in water. Typically the resin is solubilized by neutralzing it with base that is stoichiometrically equivalent to a 5-55 mole percent of the carboxylic acid units in the emulsion. Preferably, the cations in the base should be monovalent cations, such as sodium or potassium salts. The binder solution generally has a pH of from about 4 to about 9, with more preferable pH values being from about 6 to 8, or from about 6 to 7.

The binder of the invention generally has salt-sensitive properties such that it provides a characteristic wet strength index of less than 25 in deionized water and a characteristic wet strength index elevation of at least 35 points in a 10% NaCl solution. Preferably, the binder provides a wet strength index of less than 10 in deionized water with an index elevation of at least 50 points in a 10% solution of NaCl. The binder has typical characteristic wet strength index values in a 10% NaCl solution of at least about 40 and a characteristic wet strength index value of less than about 10 in DI water. Preferably, the binder provides a characteristic wet strength index of at least about 80 in 10% NaCl, and less than about 5 in DI water, and more preferably provides an index of at least about 100 in 10% NaCl, and less than about 5 in DI water.

The present invention also provides for a disposable article having a nonwoven web which is provided with a salt-sensitive polymeric binder comprising an emulsion-polymerized, water-solubilized resin composition having: (i) a copolymer with from about 5 to about 80 wt. percent of carboxylic acid units, and from about 10 to about 95 wt. percent of ethylenically unsaturated comonomer units; and (ii) an amount of emulsifier effective to maintain a stable aqueous emulsion with the copolymer as it polymerizes, where the binder provides a characteristic wet strength index of less than 25 in deionized water and a characteristic wet strength index elevation of at least 20 points in a 10% aqueous solution of NaCl.

The disposable article is preferably in contact with a wetting composition that includes at least about 0.1 wt. percent of an inorganic salt. The disposable article may be a wet wipe, a household wipe, a diaper, an incontinence garment, or feminine care product.

Further features and advantages of the present invention will become apparent from the discussion that follows.

BRIEF DESCRIPTION OF THE DRAWINGS

The invention is described in detail below with reference to the following drawing.

DETAILED DESCRIPTION

Figure 1:
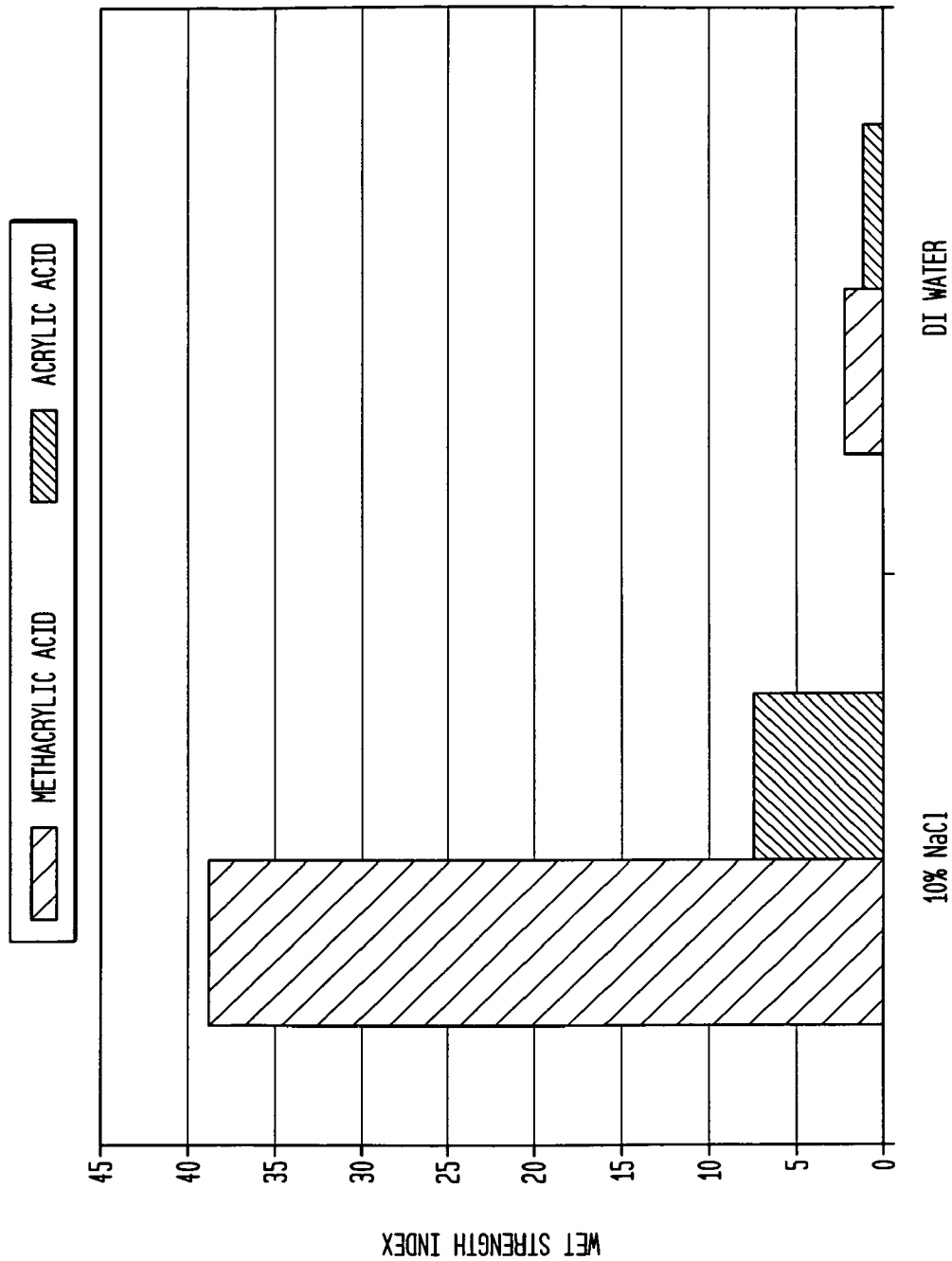
FIG. 1 is a graph comparing the salt-sensitive properties of methacrylic acid terpolymer with a corresponding acrylic acid terpolymer.

The present invention is described in detail below with reference to the various examples. Modifications to particular examples within the spirit and scope of the present invention, set forth in the appended claims, will be readily apparent to those of skill in the art.

Unless otherwise indicated, terms are to be construed in accordance with their ordinary meaning. Percent, for example, refers to weight percent, unless context indicates otherwise. Following are some exemplary definitions of terms used in this specification and the appended claims.

The phrase "an amount of emulsifier effective to maintain a stable aqueous emulsion" as the binder polymerizes, refers to an amount of emulsifying agent needed to prevent the polymer and water from separating into non-emulsified phases over at least the polymerization time. As a person of skill in the art will recognize, the effective amounts of emulsifier needed to maintain a stable aqueous emulsion will vary depending on the composition of the polymer and other factors.

"Non-woven," "non-woven web," and like terminology, refer to materials formed from loosely assembled fibers, which are bound together, in part, by a polymer binder. The binder plays an important role in the material properties, such as strength of the non-woven material.

The phrase, "binder solution", and like terminology, refers to an aqueous composition containing an emulsion polymerized binder where the polymer is neutralized with base at least to the point where the composition is no longer opaque. Aqueous polymeric emulsions (also referred to herein as "latexes"), are typically opaque, milky-white liquids. When the emulsion copolymer employed in the present invention is neutralized, it begins to solubilize and the liquid becomes more transparent. For the purposes of the present invention, the emulsion copolymer is preferably neutralized to an optimum point whereby the aqueous composition becomes as clear as possible. Similarly, the phrases "water-solubilized," and "water soluble," when used in reference to an emulsion polymerized binder, mean that the polymer has been neutralized with base at least to the point where it would be optically translucent as a 20 weight percent aqueous composition.

"Wet tensile strength" is the tensile strength of a web when wetted. The wet tensile strength as used herein is measured according to the TAPPI UM 656 procedure and is reported in gf/in, consistent with the tests in the Examples illustrated below.

"Wet strength index" as used herein, is defined as the normalized cross-machine wet tensile strength in gf/in (adjusted for basis weight; see Examples below) of a web divided by the amount of binder add-on.

"Characteristic wet strength index" refers to the wet strength index that a binder or binder solution provides to a standard web when subjected to standard conditions, and soaked in a specified solution. For the purposes of this invention, the characteristic wet strength index is a property of the binder which is measured as set forth in the Examples below. Accordingly, the characteristic wet strength index of a binder is determined by finding the average cross-machine wet tensile strength of samples which have been cut from Whatman No. 4 filter paper, provided with an amount of binder solution equivalent to an add-on of from 10-16 percent, dried, and then soaked for 60 minutes in the prescribed solution. The resulting tensile strength is normalized to a basis weight of 112.5 gsm, which is a representative average basis weight for testing purposes. The characteristic wet strength index is then calculated by dividing the normalized wet tensile strength (in units of gf/in) by the percent of binder add-on.

"Salt sensitive," when used in reference to a binder, refers to the characteristic of a binder to provide a higher wet strength index in concentrated salt solutions as compared to its wet strength index in deionized water. The compositions of the present invention typically exhibit a wet strength index in deionized water of less than 25 and a characteristic wet strength index in an aqueous solution of 10% NaCl that is at least 15 points higher than it exhibits in deionized water, i.e., the binder exhibits at least a 15 point index elevation in solutions with 10% salt. In preferred embodiments, the binder exhibits a wet strength index elevation in an aqueous solution of 10% NaCl of at least 20 points, 35 points or, even more preferably at least 50 points. Thus, the binders employed in the present invention are dispersible in deionized water and non-dispersible in solutions containing high ion concentrations. Although 10% NaCl solutions are used as a reference for concentrated salt solutions, it should be understood that the binders of the present invention will typically be non-dispersible in aqueous solutions having a salt content of at least about 0.5 wt. percent or, perhaps, even lower. The fibrous webs exhibit similar salt-sensitive dispersibility behavior when provided with the binder. The dispersibility of a web is inversely proportional to the wet tensile strength, i.e., high wet strengths correspond to a low dispersibility.

The salt-sensitive binder compositions provided in the present invention comprise water and an emulsion polymerized, water-solubilized binder composition which includes a copolymer comprising from about 5 to about 80 wt. percent of carboxylic acid monomer units and from about 10 to about 95 wt. percent of ethylenically unsaturated comonomer units.

The carboxylic acid monomers used in the inventive binder compositions typically comprise methacrylic acid. While acrylic acid may be used in certain embodiments, it has been surprisingly discovered that polymers of the invention which include methacrylic acid generally have superior salt-sensitive properties compared to those made with acrylic acid. Without intending to be bound by any theory, it is believed that methacrylic acid exhibits substantially improved results compared to acrylic acid, because the emulsion polymerization/neutralization process of the invention is less compatible with more hydrophilic monomers, such as acrylic acid. It is seen, for example, in FIG. 1, that the acrylic acid terpolymer of Example 18 does not exhibit sufficient strength in salt solutions as compared to the corresponding methacrylic acid terpolymer of Example 17.

Additional carboxylic acid monomers which may be suitable include one or more of the following $C_3$-$C_8$ ethylenically unsaturated carboxylic acid monomers: maleic acid, crotonic acid, itaconic acid, fumaric acid, aconitic acid, vinyl sulfonic acids and vinyl phosphonic acids, acryloxypropionic acid, methacryloxypropionic acid, beta-carboxy ethyl acrylate, monomethyl maleate, monoethyl maleate, monomethyl fumarate, monomethyl itaconate and the like, fatty acids such as lauroleic acid, myristoleic acid, palmitoleic acid, oleic acid, ricinoleic acid, linoleic acid, linolenic acid, eleostearic acid, laconic acid, gadoleic acid, arachidonic acid, erucic acid, clupanodonic acid, nisinic acid, and combinations thereof. The carboxylic acid may be present in the copolymer an amount of from 5 to 80 wt. percent, or from about 20 to about 55 wt. percent.

Suitable ethylenically unsaturated monomers units are well known in the art. These monomers may comprise (meth) acrylates, maleates, (meth)acrylamides, itaconates, vinyl esters, styrenics, acrylonitrile, nitrogen functional monomers, alcohol functional monomers, and unsaturated hydrocarbons. In some embodiments, the ethylenically unsaturated monomer units also comprise hydrophobic monomers and/or hardening monomers, as is discussed in detail below.

Preferably, the ethylenically unsaturated comonomer units comprise alkyl acrylate monomers. The alkyl acrylate monomers used in the polymer composition may include alkyl and hydroxyl alkyl esters of acrylic acid, where the alkyl moiety has from 1 to 4 carbon atoms. The alkyl acrylates suitably have from 2 to 4 carbon atoms in the alkyl moiety. Exemplary alkyl acrylate monomers include methyl acrylate, ethyl acrylate, butyl acrylate, 2-hydroxyethyl acrylate, 2-hydroxybutyl acrylate, and the like. Butyl acrylate monomer is especially preferred. The copolymer generally comprises from about 30 to 70 wt. percent of alkyl acrylate monomers. In some embodiments, the copolymer consists essentially of alkyl acrylate monomers and carboxylic acid monomers, such that other components are not present in amounts that affect the basic and novel characteristics of the inventive binders—namely their salt-sensitivity. Also, while it is recognized that butyl acrylate and like lower alkyl acrylates may be somewhat hydrophobic, they are not considered a "hydrophobic monomer" for the purposes of this invention.

As noted above, the ethylenically unsaturated monomers may comprise hydrophobic monomers in amounts such that the salt-sensitive copolymer includes from 2 to 55 wt. percent of hydrophobic monomer units. The presence of a hydrophobic monomer may improve the triggering properties of the binder, particularly in applications where hard water dispersibility is desired. The hydrophobic monomer is selected from alkyl (meth)acrylamides having from 2 to 15 carbon atoms in the alkyl moiety, straight chained or branched alkyl methacrylates having from 4 to 12 carbon atoms in the alkyl moiety, straight chained or branched alkyl acrylates having from 5 to 12 carbon atoms in the alkyl moiety, a substituted or unsubstituted cycloalkyl (meth)acrylate, and combinations thereof.

The alkyl (meth)acrylamide component includes alkyl and carbonyl alkyl (meth)acrylamides having from 2 to 15 carbon atoms in the alkyl moiety, and preferably from 4-12, or 6-10 carbon atoms in the alkyl moiety. Exemplary monomers include those such as tertiary butyl acrylamide, N-tertiary octyl acrylamide, isopropyl acrylamide, and N-(1,1,-dimethyl-3-oxobutyl)acrylamide. A preferred alkyl acrylamide is N-tertiary octyl acrylamide (8 carbon atoms in the alkyl moiety) which may have the following structures.

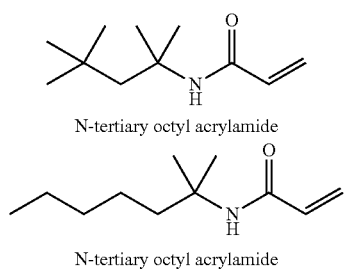

N-tertiary octyl acrylamide

N-tertiary octyl acrylamide

The hydrophobic monomer units may further comprise an alkyl methacrylate which should generally have from 4 to 12 carbon atoms in the alkyl moiety, preferably from 4 to 6 carbon atoms in the alkyl moiety. Suitable alkyl methacrylate monomers include n-butyl methacrylate.

The hydrophobic monomer units may also include straight chained or branched alkyl acrylates which have from 5 to 12 carbon atoms in the alkyl moiety. Exemplary alkyl acrylates of this type include hexyl acrylate and 2-ethylhexyl acrylate. However, while hydrophobic alkyl methacrylate or alkyl acrylate monomers may be suitable in many embodiments, the salt-sensitive copolymer used in the invention preferably has less than 5 wt. percent of straight or branched chain alkyl (meth)acrylates that have from 8 to 12 carbon atoms in the alkyl moiety, e.g. 2-ethylhexyl acrylate. Indeed, typically the copolymer is substantially free of hydrophobic monomers such as 2-ethylhexyl acrylate.

If the hydrophobic monomer units comprise a cycloalkyl (meth)acrylate, (including bi-cycloalkyl (meth)acrylates), it should contain from 4 to 20 carbon atoms in the cycloalkyl moiety. Suitable cycloalkyl (meth)acrylate monomers include isobornyl acrylate, isobornyl methacrylate, cyclohexyl (meth)acrylate, 3,5,5-trimethylcyclohexyl (meth)acrylate, 4-tert-butylcyclohexyl (meth)acrylate, and mixtures thereof. Preferably, the monomer is a bi-cycloalkyl (meth)acrylate with from 6 to 12 carbon atoms in the cycloalkyl moiety; isobornyl methacrylate which has the following structure, is especially preferred:

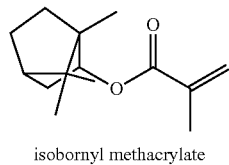

isobornyl methacrylate

The ethylenically unsaturated monomers used in the salt-sensitive copolymer may also include hardening monomers in amounts such that the copolymer includes from 2 to 55 wt. percent of hardening monomer units. More preferably, the hardening monomer units are present in the ranges of from 10 to 50 wt. percent, or from 15 to 45 wt. percent. As used herein, "hardening monomers" refers to monomers having a glass transition temperature (based on a homopolymer of that monomer) of at least −40° C. Preferably the hardening monomer has a glass transition temperature of greater than 0° C., and suitably in the ranges of 40° C.-140° C. or 80° C.-120° C.

It should be understood, of course, that many monomers used in the invention may be characterized as both a hardening monomer and a hydrophobic monomer. Most preferably, the hardening monomer comprises methyl methacrylate which has a glass transition temperature of about 105° C. It is believed that the addition of monomers which raise the glass transition temperature of the salt-sensitive polymer may also favorably affect the triggering properties of the binder.

Monomers with substantial irreversible cross-linking characteristics should generally not be used with the polymers of the present invention because a significant amount of cross-linking will adversely affect the dispersibility of the copolymer in water. The copolymer should generally contain less than about 1.0 wt. percent, suitably less than 0.25 wt. percent of pre-crosslinkable monomers. Desirably, the copolymer should also contain less than 0.25 wt. % of post-crosslinkable monomers, and preferably should contain no post-crosslinkable monomers. Pre-crosslinkable monomers crosslink with themselves during the polymerization to build polymer molecular weight, and would include monomers containing at least two vinyl end groups such as divinyl benzene, among others. Post-crosslinkable monomers crosslink with themselves after the polymer has been formed. Post-crosslinkable monomers generally require a catalytic or thermal inducement to crosslink, and can often times also crosslink with cellulosic substrates. Examples of post-crosslinkable monomers include methylol containing monomers such as methylol acrylamide. In most embodiments, the copolymer employed in the present invention contains less than 0.1%, and preferably no monomers which exhibit significant cross-linking ability.

The copolymers employed in the present invention are produced by emulsion polymerization. A general method for emulsion polymerization is disclosed in United States Patent Application Publication No. 2003/0164476 to Guo et al. The emulsion polymerization is typically carried out in an aqueous medium at a pH of lower than about 5.0, preferably at about 2.0 and at temperatures of less than 100° C., and preferably in the range of 40° C. to 80° C. Typically, a seeded or unseeded process is utilized to copolymerize the monomers in water with a surfactant. The polymerization occurs once the monomer and the initiator are added to the charge. The polymerization may be carried out batchwise, stepwise or continuously with batch and/or continuous addition of the monomer in the conventional manner.

Suitably, at least one emulsifier is present in the polymerization. The emulsifier is present in an amount that is effective to maintain a stable aqueous emulsion of the copolymer as it polymerizes. Emulsifying agents may include surfactants and/or protective colloids. Emulsifiers perform many functions in emulsion systems including solubilizing hydrophobic monomers, determining the size of the latex particles (typically, more emulsifier results in smaller latex particles), lessening the latex sensitivity to electrolytes and providing stability to the emulsion both during and after polymerization. The amount of emulsifying agent is typically about 0.05 wt. percent to about 10 wt. percent, preferably from 0.1 to 5 percent based on the total solids weight. For salt-sensitive binders, the emulsifier should generally be present in low enough amounts such that the salt-sensitive properties of the binder are not materially affected by the emulsifying agent; it is known, for example, that excess surfactant can impede the triggering mechanism of the resin.

The emulsifiers used in the invention are preferably either anionic, non-ionic, or cationic surfactants. Suitable anionic surfactants include fatty acid soaps, sulfonated fatty acids, alkyl carboxylates, alkyl sulfates, alkyl sulfonates, alkali metal alkyl aryl sulfonates, alkali metal alkyl sulfates, sulfonated alkyl esters, alkylaryl disulfonates, sulfates of hydroxylalkanols, sulfates and phosphates of polyethoxylated alkanols and alkyphenols, as well as esters of sulfosuccinic acid; specific examples include sodium dodecylbenzene sulfonate, sodium disecondary-butylnaphtalne sulfonate, sodium lauryl sulfate, disodium dodecyldiphenyl ether disulfonate, disodium n-octadecylsulfosuccinate, sodium dioctyl sulfosuccinate, among others. Non-ionic surfactants include the addition products of 5 to 50 moles of ethylene oxide adducted to straight-chained and branch-chained alkanols with 6 to 22 carbon atoms, or alkylphenols, of higher fatty acids, or higher fatty acid amides, or primary and secondary higher alkyl amines; as well as block copolymers of propylene oxide with ethylene oxide and mixtures thereof. Poly(vinyl alcohol) may also be used as a nonionic stabilizer. Cationic surfactants may include alkyl quaternary ammonium salts and alkyl quaternary phosphonium salts, such as: alkyl trimethyl ammonium chloride, dieicosyldimethyl ammonium chloride, didocosyldimethyl ammonium chloride, dioctadecyldimethyl ammonium chloride; dioctadecyldimethyl ammonium methosulphate, ditetradecyldimethyl ammonium chloride, and naturally occurring mixtures of above fatty groups, e.g., di(hydrogenated tallow) dimethyl ammonium chloride; di(hydrogenated tallow) dimethyl ammonium methosulfate, ditallow dimethyl ammonium chloride, and dioleyldimethyl ammonium chloride. Cationically modified polyvinyl alcohol and cationically modified starch may also be used as emulsifying agents. Preferably, the surfactants used in the present invention are primarily anionic ether sulfate surfactants. Preferred surfactants are Disponil FES 993 or Standapol ES-40, available commercially from the Cognis Corporation.

In preferred embodiments, the emulsifying agent is a surfactant monomer that is polymerized into the polymer backbone. Using a polymerizable surfactant is advantageous because when the emulsifying agent is polymerized into the backbone, there is essentially no free surfactant in the water phase of the emulsion; this is desirable because the presence of free surfactants may negatively affect the triggering mechanism of the inventive binder.

The polymerizable surfactant monomers are typically compositions having both hydrophilic and hydrophobic functional groups, and a polymerizable group. Polymerizable groups include allyl, acryl, methallyl or methacryl groups. Suitable polymerizable surfactant monomers may include anionic surfactants such as sulphates, phosphates, sulphosuccinate half esters, and sulphosuccinate diesters bearing copolymerizable reactive groups and nonionic surfactant monomers such as nonylphenoxy propenyl polyethoxylated alcohols. Additionally, ammonium or metal salts of unsaturated $C_6$ to $C_{30}$ organic acids may be suitable; these may be used alone or in combination with the above surfactants. Suitable polymerizable surfactants are described in U.S. Pat. No. 5,332,854 to Yokota et al., and European Patent No. 1479699, the entireties of which are incorporated herein by reference. Preferred polymerizable surfactants include Hitenol BC 1025 (Montello Incorporated), Trem LF-40 (a sodium dodecyl allyl sulfosuccinate surfactant available from the Henkel Corporation), and Adeka Reasoap Series Surfactants such as SR-10 (Asahi Denka Co., Ltd.). It is believed Hitenol BC and SR-10 have the following respective structures:

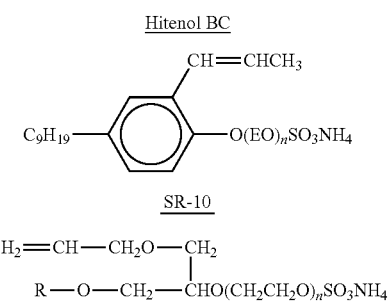

The general structures of exemplary polymerizable surfactants are illustrated in Table 1, below:

TABLE 1

| Polymerizable Surfactants | |
|---|---|
| $\text{CH}_2=\overset{R^1}{\underset{\underset{OOCR^3}{|}}{C}}\text{COOCH}_2\overset{R^2}{\underset{|}{C}}\text{CH}_2\text{SO}_3\text{M}$ | wherein $R^1$ and $R^2$: H or $CH_3$; $R^3$: $C_{7-21}$ alkyl or alkenyl group; and M: alkali metal or ammonium group (see Japanese Patent Laid-Open Publication No. 144317/1979) |
| ⌬—COOCH$_2$CH$_2$OOCC(R)=CH$_2$ / COOCH$_2$CH$_2$SO$_3$M | wherein R: H or $CH_3$; and M: alkali metal, ammonium group, or amine (see Japanese Patent Laid-Open Publication No. 115419/1980) |
| $\text{CH}_2=\overset{R}{\underset{|}{C}}\text{COO(AO)}_n\text{SO}_3\text{M}$ | wherein R: H or $CH_3$; A: alkylene group; n: integer of 2 or more; and M: monovalent or divalent cation (see Japanese Patent Laid-Open Publication No. 34947/1967) |
| $\text{CH}_2=\overset{R^1}{\underset{|}{C}}\text{CH}_2\text{(AO)}_n\text{OOCCHSO}_3\text{M}$ <br> $\quad\quad\quad\quad\quad\quad R^2\text{OOCCH}_2$ | wherein $R^1$: H or $CH_3$; $R^2$: unsubstituted or substituted hydrocarbon group or the like; A: $C_{2-4}$ alkylene group or substituted alkylene group; and n: 0 or positive number (see Japanese Patent Publication No. 46291/1974) |

TABLE 1-continued

Polymerizable Surfactants $$CH_2=\overset{R^1}{\underset{}{C}}CH_2OCH_2\overset{OH}{\underset{}{C}}HCH_2OOCCHSO_3M$$
$$R^2(AO)_nOOCCH_2$$

wherein
R$^1$: H or CH$_3$;
R$^2$: unsubstituted or substituted hydrocarbon group, amino group or the like;
A: C$_{2-4}$ alkylene group;
n: 0 to 100; and
M: monovalent or divalent cation
(see Japanese Patent Laid-Open Publication No. 203960/1983)

$$\underset{R^3}{\overset{R^1}{\underset{R^2}{\text{benzene ring}}}}\overset{CH=CHCH_3}{\underset{}{}}-O-(AO)_nSO_3M$$

wherein
R$^1$: C$_{6-18}$ alkyl group or the like:
R$^2$: H, C$_{6-18}$ alkyl group or the like;
R$^3$: H or propenyl group;
A: C$_{2-4}$ alkylene group or substituted alkylene group.
M: alkali metal or the like; and
n: 1 to 200
(see Japanese Patent Laid-Open Publication No. 53802/1992)

$$CH_2=\overset{R^1}{\underset{}{C}}CH_2OCH_2$$
$$\overset{|}{C}HO(AO)_LSO_3M$$
$$\overset{|}{C}H_2O(AO)_mR^2$$

wherein
R$^1$: H or CH$_3$;
R$^2$: C$_{8-24}$ hydrocarbon group or the like;
A: C$_{2-4}$ alkylene group;
M: H, alkali metal, alkaline earth metal, ammonium group or the like;
L: 0 to 20; and
m: 0 to 50
(see Japanese Patent Laid-Open Publication No. 104802/1987)

$$\overset{OH}{\underset{}{C}}HCOOCH_2CHCH_2SO_3M$$
$$\overset{||}{C}HCOOR$$

wherein
R: C$_{8-22}$ hydrocarbon group; and
M: alkali metal or ammonium group
(see Japanese Patent Laid-Open Publication No. 40388/1974)

$$CH_2=\overset{OH}{\underset{}{C}}COOCH_2CHCH_2SO_3M$$
$$\overset{|}{C}H_2COOR$$

wherein
R: C$_{8-22}$ hydrocarbon group; and
M: alkali metal or ammonium group
(see Japanese Patent Laid-Open Publication No. 40388/1974)

$$\overset{CHCOO(AO)_mR}{\underset{CHCOOM}{||}}$$

wherein
R: alkyl or alkylphenyl;
A: ethylene;
M: ammonium, amine, or alkali metal; and
m: 9, 12, 14, or 28 (working example)
(see Japanese Patent Laid-Open Publication No. 134658/1977)

$$CH_2=\overset{R^1}{\underset{}{C}}CO(OCH_2CH_2)_nOR^2$$

wherein
R$^1$: H or CH$_3$;
R$^2$: H, CH$_3$, or —C$_6$H$_4$—(CH$_2$)$_m$—H;
and
n: 4 to 30
(see Japanese Patent Laid-Open Publication No. 126093/1978)

$$CH_2=\overset{R^1}{\underset{}{C}}COO(C_2H_4O)_x(\overset{CH_3}{\underset{}{C}}HCH_2O)_y(C_2H_4O)_zR^2$$

wherein
R$^1$ and R$^2$: H or CH$_3$;
x: 0 to 100;
y: 0 to 100;
z: 0 to 100; and
$1 \leq x + y + z \leq 100$
(see Japanese Patent Laid-Open Publication No. 28208/1981)

$$\underset{R^3}{\overset{R^1}{\underset{R^2}{\text{benzene ring}}}}\overset{CH=CHCH_3}{\underset{}{}}-O-(AO)_nH$$

wherein
R$^1$: C$_{6-18}$ alkyl group or the like;
R$^2$: H, C$_{6-18}$ alkyl group or the like;
R$^3$: H or propenyl group;
A: C$_{2-4}$ alkylene group or substituted alkylene group; and
n: 1 to 200
(see Japanese Patent Laid-Open Publication No. 50204/1992)

$$CH_2=\overset{R^1}{\underset{}{C}}CH_2OCH_2$$
$$\overset{|}{C}HO(AO)_LH$$
$$\overset{|}{C}H_2O(AO)_mR^2$$

wherein
R$^1$: H or CH$_3$;
R$^2$: C$_{8-24}$ hydrocarbon group or acyl group;
A: C$_{2-4}$ alkylene group;
L: 0 to 100; and
m: 0 to 50
(see Japanese Patent Laid-Open Publication No. 104802/1987)

TABLE 1-continued

Polymerizable Surfactants

| | |
|---|---|
| $CH_2{=}\underset{\underset{(CH_2)_LCOO(A^2O)_nR^2}{\|}}{C}COO(A^1O)_mR^1$ | wherein $R^1$ and $R^2$: H, $C_{1-20}$ hydrocarbon group, or acyl group; $A^1$ and $A^2$: $C_{2-4}$ alkylene group or substituted alkylene group; L: 1 or 2; m and n: 0 or positive number with the proviso that m + n ≧ 3; and when both $R^1$ and $R^2$ are H, m and n ≧ 1 (see Japanese Patent Laid-Open Publication No. 98484/1975) |

Surfactants have a tendency to lower the surface tension in water, which normally has a surface tension of about 73 dyne/cm. Typically, the surfactants used in the present invention reduce the surface tension of water by at least 30 percent when measured at 10% solids in water. Preferably, the surfactants reduce the surface tension of the water by at least 40, or even 50 percent when measured in 10% aqueous solutions. The surface tensions of water and 10% aqueous solutions of sodium AMPS, Hitenol BC 1025, and Hitenol BC 05 are listed in Table 2, below.

TABLE 2

Surface Tension Activity

| Solution | Surface Tension at 10% solids (dyne/cm) |
|---|---|
| Water | 73 |
| 10% Sodium AMPS | 59 |
| 10% Hitenol BC 1025 | 36 |
| 10% Hitenol BC 05 | 29.6 |

As can be seen from Table 2, NaAMPS reduced the surface tension in water by only about 19%; thus, AMPS compounds are preferably not used as the primary emulsifying agent.

Protective colloids may also be used as a stabilizing agent. Examples of suitable protective colloids are polyvinyl alcohols, starch and cellulose derivatives, and vinylpyrrolidone copolymers. Protective colloids may also be used in conjunction with other emulsifying agents.

Initiators are typically added to the aqueous medium to stimulate polymerization. The initiators are commonly water-soluble and may decompose by high temperature or through redox reactions. The Guo reference noted above describes suitable thermal initiators and suitable redox initiator systems. Exemplary initators include peroxygen compounds such as ammonium persulfate, potassium persulfate, sodium persulfate; peroxides such as hydrogen peroxide; organic hydroperoxides, such as cumene hydroperoxide, t-butyl hydroperoxide; organic peroxides, such as benzoyl peroxide, acetyl peroxide, lauroyl peroxide, peracetic acid, and perbenzoic acid; and azo-type compounds such as azodiisobutyl nitrile, azobisdimethyl valeronitrile, azobisisobutyl nitrile, azodiisobutyl amide, azobis(alpha-ethylbutyl nitrile) and azobis(alpha, gamma-dimethylcarponitrile).

A chain transfer agent may also be added to control the molecular weight of the polymer. The chain transfer agent may be present in amounts ranging from 0% to about 5% based on the total weight of the monomers, and is preferably from about 0.2% to about 1.2%. The amount of chain transfer agent in the polymerization is inversely proportional to molecular weight; thus, if more chain transfer agent is added, the molecular weight will be lower. The chain transfer agent may include any compound which is able to transfer free radicals. Suitable chain transfer agents include carbon tetrachloride, bromoform, bromotrichloromethane, triphenyl methane, mercapto propionic acid, alkyl mercaptans and thioesters such as n-dodecyl mercaptan, t-dodecyl mercaptan, octyl mercaptan, tetradecyl mercaptan, hexadecyl mercaptan, butyl thioglycolate, isooctyl thioglycolate, and dodecyl thioglycolate.

Other ingredients may be used in the emulsion polymerization that are well known in the art including chelating agents, buffering agents, inorganic salts and pH adjusting agents.

The emulsions thus prepared will generally have a solids content of from about 20 to about 60%, and preferably about 40%. Prior to neutralization, the emulsion may be diluted with water until it has a solids content ranging from about 10 to about 35%, preferably from 15 and 25%. Alternatively, the composition may be neutralized into solution and then diluted to the desired solids content or, perhaps, not diluted at all. Generally, the salt-sensitive copolymer(s) should comprise from about 25 to 100 weight percent, preferably 50 to 99.9 weight percent of the total solids in binder composition. Water should be the primary medium in the binder composition although organic solvents may be present in lesser amounts, i.e. less than about 20%.

The molecular weight of the copolymers is not particularly limited, though it does affect the salt-sensitive properties of the polymer. The desired molecular weight range will depend on the specific monomer components and the desired application of the binder. Typically, however, the molecular weight of the polymer should be about 40,000 g/mol to about 500,000 g/mol, and preferably about 60,000 g/mol to about 250,000 g/mol. In general, the copolymers made according to the present invention exhibit a decrease in solubility as the molecular weight goes up, as is illustrated more completely in the examples which follow.

The emulsion polymer typically has a particle size of from 10 to 1000 nm, preferably about 50 to 300 nm. The morphology of the polymer may vary from spheres to core-shell structures, voids, half-moons, and the like. When monomers of drastically different solubility or hydrophobicity are polymerized in an emulsion process, a wide variety of morphologies may result.

As stated above, the copolymer must be neutralized into solution in order to prepare the water-solubilized latex binder. To neutralize the copolymer, base is added to the emulsion until the composition becomes optically transparent; the pH is recorded at this point. Preferably, enough base is added just until the point where the emulsion becomes as translucent as possible. Typically, about 5 to about 55 mole % of the carboxylic acid units in the emulsion are neutralized. Suitable bases include NaOH, KOH, $Na_2CO_3$, $NaHCO_3$, and the like. Preferably, the base should be non-volatile and contain only monovalent ions.

The emulsions typically become water-solubilized when the solution reaches a pH of from 4.0 to 9.0, preferably from about 6.0 to 8.0, and even more preferably from about 6.0 to 7.0. Control of neutralization and final solution pH is an important part of the process. Polymers that are over-neutralized can experience problems with viscosity or may exhibit excess base leeching into wetting solutions. Using a relatively mild pH value in the inventive compositions is of great advantage in disposable consumer applications. Such pHs are desirable because they are compatible with a user's skin and will not likely cause irritation upon contact. It is, however, possible to utilize salt-sensitive, solubilized polymers with pH values outside the desired range. To make a fibrous web more compatible with a user's skin in such circumstances, the polymer may be applied to a fibrous web and the web may be treated with acidic agents, buffers, or the like.

It should be understood that the degree of neutralization required for the binder solutions to exhibit the desired properties (e.g., solubility, viscosity, salt-sensitivity) will vary depending on the composition and properties of the polymer. Such factors will include things such as the amount of acid monomer in the polymer chain and the molecular weight of the polymer.

The viscosity of the binder solution will also depend on many factors, e.g., the monomer content of the polymer. However, regardless of the makeup of the solution, the viscosity can generally be controlled by regulating one or more of the following aspects: 1) the amount of solids content in the emulsion; 2) the molecular weight of the polymer; 3) the extent that the composition is diluted either before or after neutralization; and 4) the extent of neutralization. The viscosity of the composition should be controlled so that it may be applied to a fibrous web by normal means, and also so that the composition adequately impregnates the web, thereby at least partially binding the fibers together. Thus, the viscosity of the binder composition should be below about 2,000 cps at room temperature (23° C.). Preferably it should be below, 1000 cps, 500 cps, 200 cps and more even more preferably below 150 cps at room temperature.

Other adjuvants may also be incorporated into the binder solution as dictated by the nature of the desired composition as well known by those of ordinary skill in the art. Examples of additives traditionally used include plasticizers, surfactants, tackifiers, thickeners, fillers, humectants, fragrances, pigments, titanium dioxide or other opacifiers, colorants, antifoams, bactericides, bacteriostats, and encapsulated components which may be employed in conventional amounts.

The fibrous webs employed in the present invention are non-woven webs.

The non-woven structures of the present invention comprise the polymeric binder in combination with fibers. The non-woven is formed by any process known in the art, such as, but not limited to, airlaid, wetlaid, drylaid, or carded fiber. The fiber web typically has a basis weight of from 20-200 grams per square meter (gsm). The fibers in the non-woven material may be oriented isotropically, or be aligned with respect to a processing direction. Thicker non-wovens may additionally have fiber oriented in the z-direction of the article, i.e. perpendicular to the fabric plane. In addition to a binder material, the fibers in the non-woven materials may be interlocked mechanically to provide strength and cohesion.

In the manufacture of nonwoven webs, the fibers are typically dispersed in a medium (air for air-laid and liquid for wet-laid) and deposited in sheet form on a support base. In air-laid processes the fibers and other optional materials are typically suspended in air within a forming system and deposited as a sheet-like structure onto a moving forming screen or a rotating cylinder, prior to application of the binder. Wet-laid processes include providing an aqueous slurry and drying the slurry to form the web.

Fibers from any source and of any suitable length may be used in the present invention. Fibers include those known in the art including cellulosic fibers from woody plants such as deciduous and coniferous trees; non-woody plants, such as cotton, flax, esparto grass, milkweed, straw, jute and bagasse; and synthetic fibers, such as those derived from polyester, polypropylene, poly-ethylene, polyamides, polyacrylics, and rayon. Other fiber materials used in the art, and mixtures of any fibers, can be used in the present invention. Preferred fibers are those typically used in non-wovens, especially wood pulp fibers having a length of less than 0.5 cm such as kraft fibers. For wet-laid webs, the fibers should generally be less than a maximum of 5 cm long and most preferably less than 2 cm long. For air-laid webs, the fibers should be less than 8 mm long, preferably less than 6 mm long. Such fibers provide good biodegradable breakdown and dispersion characteristics. Fibers are present in the web at from 50 to 98 percent by weight, depending on the end use of the disposable article. For many uses, fibers make up about 70 to 85 percent by weight of web.

Generally, the fiber web is formed or at least partially formed prior to application of binder. The binder solution is combined with the fibers by contacting the fibers with the composition by means known in the art such as, printing, spraying with or without air, saturation, creping, and foam-application. The polymer may be combined with the fibers in the wet-end of the papermaking process (e.g., by addition to the paper furnish) or, preferably, after the paper product is substantially formed (e.g., via dry end addition). After application, the fibrous web is typically subjected to a drying step to remove water and/or other liquid. Drying may be accomplished by subjecting the paper product to elevated temperatures, e.g., in the range of from about 85° C. to about 125° C. for a time sufficient to achieve the desired level of dryness, typically to constant weight.

The amount of binder composition that remains on the fibers is referred to as "add-on." The percent add-on can be calculated as follows:

$$\text{Add-on \%} = \frac{\text{Combined binder/fiber wt.} - \text{Fiber wt.}}{\text{Combined binder/fiber wt.}} \times 100\%$$

The fiber weight is the weight of the fibers before any binder composition is applied. The fiber/binder weight is the weight of the dried (dry to the touch) product. The fibrous webs will generally have an add-on value of from 2 to 50 percent by weight, preferably from 10 to 30 percent by weight.

The binder has temporary wet strength in the presence of salt. Depending on the application, it may be desirable to apply the salt to the fibrous web during production. In such cases, the salt may be applied to the article during manufacture by conventional means such a spraying, coating, dipping, etc. Generally, the water-solubilized binder composition and the salt should not be mixed together before they are added to the fibers. The reason for this is that the salt has a tendency to precipitate the polymer if the two are combined prior to addition to the fibers. Thus, the disposable article that is being treated with the polymer binder is preferably subjected to the drying step to remove water and/or any other liquid prior to the addition of salt. Upon drying, the salt component can be added to the fiber/binder substrate to develop the in-use strength. The salt is typically applied to the web in a solution containing at least about 0.5 wt. percent salt to ensure the web maintains its temporary wet strength. It is preferred to employ salts with monovalent cations such as NaCl, as opposed to salts having multivalent cations which tend to affect the dispersibility characteristics of the binder.

Pre-moistened products produced according to present invention, such as wet wipes, may contain a wetting composition. The wetting composition should desirably contain at least 0.5 percent by weight of an inorganic salt. The wetting composition may contain one or more additives, which include, but are not limited to, sodium chloride or sodium sulfate solution, preservatives, boric acid, bicarbonates, moisturizers, emollients, surfactants, humectants, alcohols, water, and fragrances. The wetting composition may be present at up to 500 percentage by weight based on the weight of the non-woven material, and preferably up to 350 percent. The wetting composition is generally added as a secondary treatment of the non-woven web. This wet solution treatment can occur just prior to packaging, or after the non-woven has been placed in the final container. Prepared in this manner, wet-use products will have a stable wet strength of measurable tensile value and integrity, yet disperse when placed in tap water, allowing the product to be flushed in sewer or septic systems without blockage. The fiber typically begins dispersing immediately in water. The rate of dispersion can be tailored for different applications by varying factors such as the composition of the polymer, the molecular weight, the degree of neutralization, the pH of the solution, or the type of fiber web.

The inventive binders are particularly suitable for applications involving pre-moistened articles because the articles may be stored in a solution containing about 0.5 wt. percent or more of salt, whereby the articles maintain a high wet strength until disposed. Pre-moistened articles include those such as wet wipes, household wipes, pre-moistened baby wipes, pre-moistened toilet tissue, and pre-moistened household wipes. The inventive binder solutions may also be suitable for other disposable applications which employ salt sensitive binders such as diapers, incontinent garments, feminine care products, and the like.

The fibrous webs of the present invention should be non-dispersible in solutions containing more than 0.5% salt, yet readily dispersible in typical wastewater. The fibrous webs used in the disposable articles of the present invention have binders that typically provide a characteristic wet strength index of at least about 40 in a 10% aqueous solution of NaCl, and preferably at least about 80, and more preferably at least about 100. Some binder compositions may provide wet strength indexes of over 120 in 10 wt. percent NaCl solutions. In addition, the binders generally provide a characteristic wet strength index in deionized water of less than 25, and preferably less than 10, and even more preferably less than 5.

The following examples are presented to further illustrate and explain the present invention and should not be taken as limiting in any regard.

EXAMPLES

Exemplary binder solutions were prepared by emulsion polymerizing the monomers to obtain a latex composition having about 30-55% solids. The emulsion polymerization procedure which was used to polymerize Examples 1-4 of the present invention is summarized below for illustrative purposes.

A quantity of 560 grams of deionized water was added to a 4 L glass reactor equipped with a condenser, thermometer and stainless steal agitator. Next, a solution of 121 grams of water and 27 grams of Disponil FES 993, an emulsifier, were mixed. The following components were then added to the water/surfactant mixture: 200 grams of methacrylic acid, 300 grams of butyl acrylate, and 2.5 grams of dodecyl mercaptan. The mixture was agitated to give a stable monomer pre-emulsion.

To the reactor charge was added, 33 grams of monomer pre-emulsion. Then, 0.3 grams of ammonium persulfate in 5 grams of water was added to the reactor charge. The reaction mixture was heated to 80° C. After 10 minutes, the remaining monomer pre-emulsion was added over a 4 hour period to the reactor. Also, 2.4 grams of ammonium persulfate in 45 grams of water was added to the reactor for about 4.5 hours. After completion of monomer and initiator slow-adds, the reaction mixture was cooled to 60° C. The metering of reducing component, which is composed of 10 grams of water and 0.7 grams of Erythorbic acid, was started at an internal reactor temperature of 60° C. The reaction mixture was maintained between 55-60° C. for 10 minutes. After completing reducer add, the reaction mixture was cooled to 30° C. The product had 40 wt. percent solids, a pH of 2.3, a viscosity of 18 centipoise, and a mean particle size of 131 nm.

After polymerization, the examples were diluted to the desired solids content which, unless specified otherwise, is at about 20%. The binder solution is then prepared at room temperature by neutralizing the polymer according to the following procedure: the emulsion composition is agitated and an aqueous solution of 15% solids sodium hydroxide is added until the desired degree of neutralization is achieved. Unless context indicates otherwise, the compositions of the examples below were neutralized at least to the point where they are as translucent as possible. The resulting compositions have a wide variety of pH values as can be seen from Table 7 below.

As described in detail below, the binder solutions were applied to pulp substrates and tested for tensile strength after being wetted with three aqueous solutions having varying ion concentrations.

The procedure for preparing the saturated pulp substrate is as follows: a pulp substrate is dip-nip saturated with binder solution and then thermally dried and post-treated to simulate temperature conditions in commercial pulp manufacturing. Whatman #4 Qualitative Filter Paper sheets, commercially available from Whatman, Inc., are the pulp base stock and are stored under controlled temperature (23° C.) and humidity (50%) conditions before use. The pulp is cut to approximately 11.5×57 cm strips and weighed to 0.01 gm.

The Whatman pulp is dip-nip saturated by passing the pulp through a binder bath and then passing the saturated sheets through the pressurized nip rolls of a dual roller saturator (Werner Mathis VFM or a similar saturator) to squeeze off the excess polymer solution. The saturated sheet is then placed into a heated drum drier (Adirondack or a similar drier) set at 100° C. until dry to the touch (usually about 2-3 passes). After initial drying, the pulp is placed into an oven set at 130° C. for two minutes. The saturated dried sheet is re-conditioned at controlled temperature and humidity conditions for a minimum of one hour. The sheet is reweighed to 0.01 gm and then calculated for % add-on. The examples below have add-on values ranging from about 10% to about 16%.

The procedure for preparation of tensile strips and soak solutions is as follows: The saturated pulp is cut into 1×4 inch cross-machine direction tensile strips using a precision paper cutter (Test Machines, Inc. or similar cutter). The tensile strips are weighed and the weight is used to calculate basis weight in grams/square meter. Test solutions are prepared as follows:
  a) Solutions of 10% sodium chloride (NaCl) by weight in deionized water.
  b) A 200 ppm hard water solution using 134 ppm $Ca^{++}$ from calcium chloride ($CaCl_2$) and 66 ppm $M^{++}$ from magnesium chloride ($MgCl_2$) in deionized water.
  c) Standard deionized water.

Tensile testing and normalization is performed as follows: The test strips are soaked in the various solutions and then measured for wet strength. The solutions represent the type of environments which the pulp may be exposed to, e.g., concentrated salt conditions for in-use storage (10%) and various water conditions for disposal (200 ppm for hard water disposal and deionized for softer water disposal).

To determine the wet tensile strength, a tensile tester (Instron 5542 or a similar tester) is set to the following parameters: a) pneumatic grips using 1×1 inch facings; b) a gap or 2 inches between the top and the bottom facings; c) a crosshead speed of 1 inch/minute; and d) a load cell capable of measuring up to 20,000 gm/inch. Tensile strips are soaked (4-6 strips per soak solution) for 60 minutes in the specified soak solution with an emphasis placed on ensuring that full wetting of the strips occurs. The level of soak solution used is as follows: a) 125 gm 10% NaCl salt solution per tensile group (4-6 strips); and b) 45 gm of hard water or deionized water per tensile strip soaked. Upon removal from the soak solution, the tensile strip is placed onto absorbent paper toweling to remove excess solution and then immediately tested for tensile strength. The average tensile strength (gf/inch) is then normalized to a web basis weight of 112.5 gsm (representative basis weight) using the following formula:

$$\text{Normalized Tensile Strength} = \frac{\text{Average Tensile Strength (gf/in)} \times 112.5 \text{ gsm}}{\text{Actual Basis Wt. (gsm)}}$$

The raw tensile strength is normalized to a standard fabric basis weight (112.5 gsm) in order to compensate for slight effects of variations in the fabric weight.

The wet strength index is then calculated for each example in order to minimize the differences in wet strength due to varying levels of binder add-on. It is calculated according to the following formula:

$$\text{Wet Strength Index} = \left( \frac{\text{Normalized Wet Tensile Strength}}{\text{Percent Add-on}} \right)$$

The wet strength index of each example was calculated in deionized water and in a 10% NaCl solution (the hard water index was also calculated for examples 28-31).

The following compositional abbreviations are used in the examples:
AA Acrylic Acid monomer
BA Butyl Acrylate monomer
BC 1025 Hitenol BC 1025, Polymerizable polyoxyethylne alkylphenyl ether ammonium sulfate surfactant
bCEA beta-Carboxy Ethyl Acrylate monomer
ES-40 Standopol ES-40 (Sulfates Alkyl Alcohol Ethoxylate, sodium salt) surfactant
ibMA Isobornyl Methacrylate monomer
MAA Methacrylic Acid monomer
MEM Monoethyl Maleate monomer
MMA Methyl Methacrylate
nBMA n-Butyl Methacrylate monomer
tOA tertiary-Octyl Acrylamide monomer
Trem LF-40 Polymerizable sodium dodecyl allyl sulfosuccinate surfactant The binders in Examples 1-4 contain butyl acrylate and methacrylic acid and the binders in Examples 5-9 further contain tOA. These examples are neutralized to varying degrees and the tensile results illustrate the effect that the amount of neutralization has on the salt-sensitive properties of the binder. In these examples, the percent sodium hydroxide used to neutralize the polymer is based on weight percent of the dry polymer, i.e. (solids/solids). Examples 1 and 5 are not neutralized and, therefore, not covered by the present invention. They are included for comparative purposes.

TABLE 3

Composition of Examples 1-9

| Example | BA | tOA | MAA | % NaOH |
|---|---|---|---|---|
| 1 | 60 | — | 40 | 0 (emulsion) |
| 2 | 60 | — | 40 | 4 |
| 3 | 60 | — | 40 | 6 |
| 4 | 60 | — | 40 | 8 |
| 5 | 50 | 10 | 40 | 0 (emulsion) |
| 6 | 50 | 10 | 40 | 4 |
| 7 | 50 | 10 | 40 | 6 |
| 8 | 50 | 10 | 40 | 8 |
| 9 | 50 | 10 | 40 | 10 |

TABLE 4

Tensile strength values for Examples 1-9

| | | | Wet Tensile Strength (normalized to 112.5 gsm) | | | Wet Strength Index | |
|---|---|---|---|---|---|---|---|
| Example | Add-on (%) | Basis Weight (gsm) | 10% NaCl (gf/in) | 200 ppm (gf/in) | DI water (gf/in) | 10% NaCl | DI water |
| 1 | 13.0 | 115.6 | 1183 | 923 | 988 | 91.0 | 76 |
| 2 | 16.1 | 111.6 | 1585 | 1307 | 595 | 98.4 | 37.0 |
| 3 | 12.1 | 113.0 | 1523 | 1104 | 169 | 125.9 | 14.0 |
| 4 | 14.4 | 111.5 | 1106 | 442 | 58 | 76.8 | 4.0 |
| 5 | 12.7 | 109.0 | 1262 | 1018 | 1051 | 99.4 | 82.8 |
| 6 | 13.4 | 111.9 | 1705 | 1411 | 655 | 127.2 | 48.9 |
| 7 | 14.7 | 114.9 | 1501 | 1201 | 155 | 102.1 | 10.5 |
| 8 | 12.6 | 118.2 | 938 | 360 | 33 | 74.4 | 2.6 |
| 9 | 14.9 | 120.3 | 376 | 73 | 17 | 25.2 | 1.1 |

Figure 2:
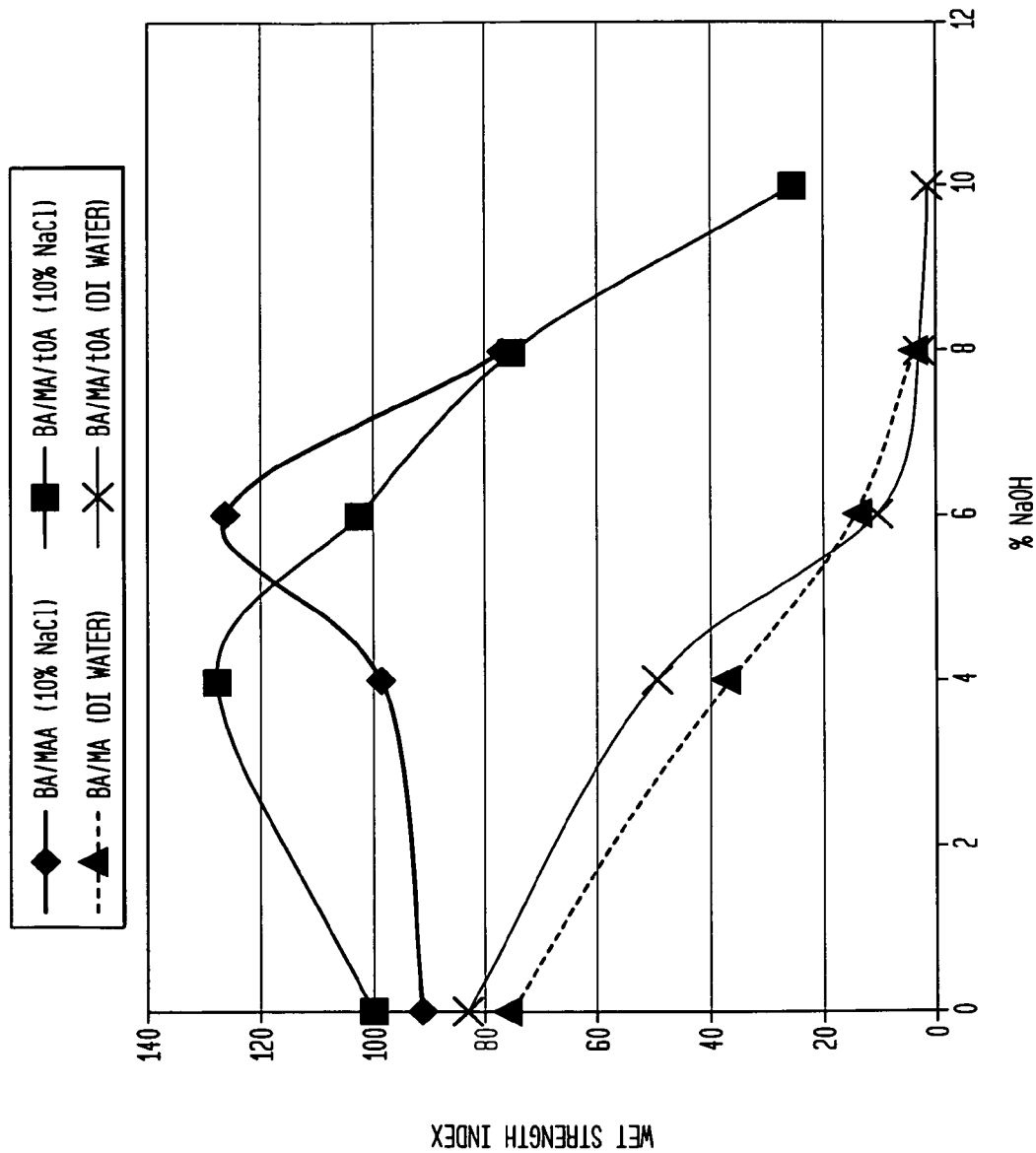
FIG. 2 is a graph of the wet strength indexes of Examples 1-9 plotted against the degree of neutralization.

The wet strength indexes from Table 4 are plotted against the amount of base used to neutralize the emulsion and is shown in FIG. 2. As can be seen from Table 4 and FIG. 2, as the degree of neutralization increases, the water-solubilized emulsion binder becomes more dispersible in the 10% NaCl solution and in deionized water. Examples 1 and 5 also illustrate that when the polymer is not neutralized at all, it has very limited salt-sensitivity properties as the difference between the 10% NaCl wet strength and the DI wet strength is small.

The compositions and tensile properties of Examples 10-16 are shown below in Tables 5 and 6. These examples illustrate the effect of chain transfer agent and molecular weight on the wet strength index. The amount of chain transfer agent present during the polymerization reaction is reported as weight percent of the total monomer content. The molecular weight is measured by GPC analysis using polystyrene standards as the reference molecular weight.

TABLE 5

Composition of Examples 10-16

| Example | BA | MMA | MAA | Chain Transfer Agent (% Dodecyl mercaptan) | Molecular weight |
|---|---|---|---|---|---|
| 10 | 43 | 44 | 13 | 1.0 | 57,000 |
| 11 | 43 | 44 | 13 | 0.5 | 118,375 |
| 12 | 43 | 44 | 13 | 0.25 | 251,055 |
| 13 | 60 | 0 | 40 | 1.0 | 66,044 |
| 14 | 60 | 0 | 40 | 0.5 | 147,531 |
| 15 | 60 | 0 | 40 | 0.25 | 301,582 |
| 16 | 55 | 5 | 40 | 0.5 | 142,791 |

TABLE 6

Effect of Mw on Wet Strength

| Example | Add-on (%) | Basis Weight (gsm) | Wet Tensile Strength (normalized to 112.5 gsm) | | | Wet Strength Index | |
|---|---|---|---|---|---|---|---|
| | | | 10% NaCl (gf/in) | 200 ppm (gf/in) | DI water (gf/in) | 10% NaCl | DI water |
| 10 | 13 | 109.0 | 503 | 439 | 27 | 38.7 | 2.1 |
| 11 | 13.6 | 108.3 | 665 | 728 | 21 | 48.9 | 1.5 |
| 12 | 14.8 | 120.5 | 877 | 1118 | 0 | 59.3 | 0 |
| 13 | 14.3 | 96.6 | 829 | 445 | 93 | 58.0 | 6.5 |
| 14 | 12.1 | 113.0 | 1523 | 1104 | 169 | 125.9 | 14.0 |
| 15 | 14.7 | 98.8 | 1959 | 1745 | 434 | 133.3 | 29.5 |
| 16 | 13.3 | 99.0 | 1309 | 864 | 84 | 98.4 | 6.3 |

Figure 3:
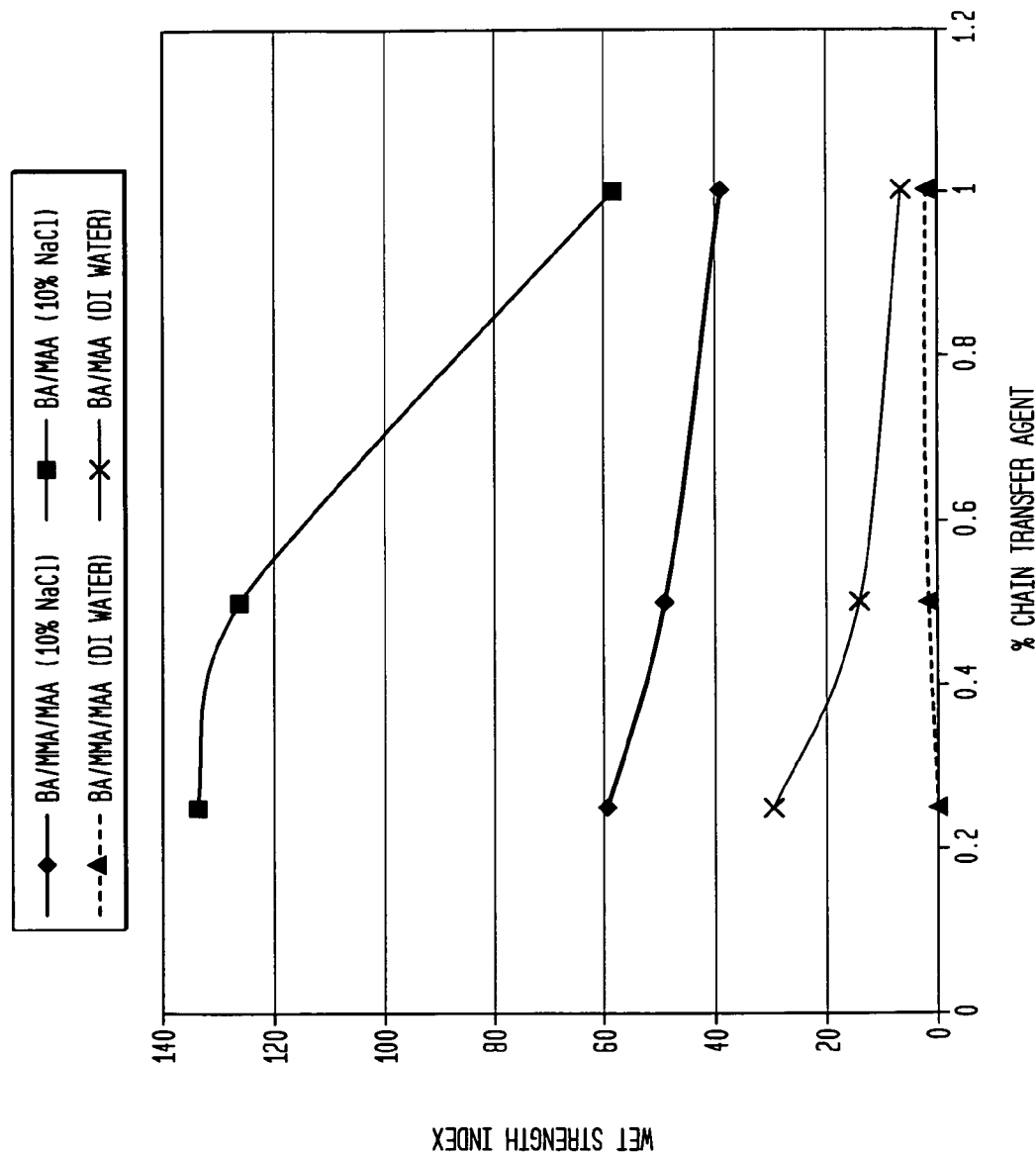
FIG. 3 is a graph of the wet strength indexes of Examples 10-15 plotted against the amount of chain transfer agent used during polymerization.

The wet strength indexes that are reported in Examples 10-15 for 10% NaCl and DI water are illustrated in FIG. 3, and are plotted against the amount of chain transfer agent. As shown in FIG. 3, using higher amounts of chain transfer agents generally causes the polymer to become more dispersible in concentrated salt solutions and DI water.

The polymers in Examples 10A-15B below, have the same corresponding compositions and molecular weights as those in Examples 10-15; that is, the polymer compositions of Examples 10A and 10B correlates to the composition in Example 10, and so on. The polymers in Examples below were diluted to a target solids content of about 20% in the "A" examples and about 25 in the "B" examples. The actual solids values are indicated in Table 7, below. The emulsions were then neutralized with 7% NaOH on a solids/solids basis and tested for the physical properties which are also reported in Table 7.

TABLE 7

Physical properties of Examples 10A-15B

| Example | Mw | % Solids | pH | Viscosity (cps) |
|---|---|---|---|---|
| 10A | 57,000 | 18.7 | 12.9 | 43 |
| 10B | 57,000 | 23.4 | 12.8 | 29,770 |
| 11A | 118,375 | 18.9 | 12.7 | 81 |
| 11B | 118,375 | ~25 | — | Gel |
| 12A | 251,055 | 19.1 | 12.7 | 548 |
| 12B | 251,055 | ~25 | — | Gel |
| 13A | 66,044 | 19.3 | 6.9 | 29 |
| 13B | 66,044 | 23.2 | 6.9 | 429 |
| 14A | 147,531 | 19.1 | 7.1 | 86 |
| 14B | 147,531 | 23.2 | 6.9 | 5,325 |

TABLE 7-continued

Physical properties of Examples 10A-15B

| Example | Mw | % Solids | pH | Viscosity (cps) |
|---|---|---|---|---|
| 15A | 301,582 | 18.8 | 7.2 | 218 |
| 15B | 301,582 | 24.2 | 6.8 | 56,920 |

As shown in Table 7, the viscosity of the water-solubilized emulsion typically increases with the molecular weight of the polymer. It can also be seen that the viscosity increases rapidly as the solids content is raised.

The compositions for Examples 17-23 are shown below in Table 8. These examples were polymerized with various carboxylic acid monomers to determine the effects of each monomer on the salt-sensitive properties of the binder. The wet tensile strengths and wet strength indexes provided by each binder composition are reported in Table 9.

TABLE 8

Composition of Examples 17-23

| Example | BA | MMA | MAA | AA | bCEA | MEM |
|---|---|---|---|---|---|---|
| 17 | 43 | 44 | 13 | — | — | — |
| 18 | 43 | 44 | — | 13 | — | — |
| 19 | 50 | 15 | 35 | — | — | — |
| 20 | 60 | — | 20 | — | — | 20 |
| 21 | 60 | — | 30 | — | — | 10 |
| 22 | 60 | — | — | — | 40 | — |
| 23 | 60 | — | 40 | — | — | — |

TABLE 9

Carboxylic acid performance

| Example | Add-on (%) | Basis Weight (gsm) | Wet Tensile Strength (normalized to 112.5 gsm) | | | Wet Strength Index | |
|---|---|---|---|---|---|---|---|
| | | | 10% NaCl (gf/in) | 200 ppm (gf/in) | DI water (gf/in) | 10% NaCl | DI water |
| 17 | 13.0 | 109.0 | 503 | 439 | 27 | 38.7 | 2.1 |
| 18 | 13.4 | 111.1 | 98 | 79 | 14 | 7.3 | 1.0 |
| 19 | 14.8 | 113.6 | 1232 | 747 | 62 | 83.2 | 4.2 |
| 20 | 9.6 | 96.2 | 267.4 | 486.5 | 86.0 | 27.9 | 9.0 |
| 21 | 9.4 | 95.4 | 580.1 | 823.0 | 113.1 | 61.7 | 12.0 |
| 22 | 8.1 | 91.7 | 101.3 | 83.6 | 28.3 | 12.5 | 3.5 |
| 23 | 10.7 | 96.8 | 1082.6 | 819.9 | 113.1 | 101.2 | 10.6 |

The results in Table 9 illustrate that for these examples, the choice of carboxylic acid monomer affects the salt-sensitive characteristics of the binder. For instance, a comparison of Examples 17 and 18 show that a BA/MMA/MAA solubilized emulsion binder provides higher wet strength in concentrated salt solutions than a BA/MMA/AA monomer, while still having good dispersibility in deionized water (see FIG. 1). Likewise, it is seen in Examples 22 and 23 that a BA/MAA binder provides nearly 8 times the wet strength of a BA/bCEA binder in 10% NaCl. It should be understood that while MAA appears to provide the best salt-sensitive performance in these examples, any carboxylic acid monomer may be used; indeed, acrylic acid or bCEA may be suitable in other polymer systems.

The salt-sensitive properties are also effected by the amount of carboxylic acid monomer, as can be seen from Examples 24-27 in Tables 10 and 11, below.

TABLE 10

Composition of Examples 24-27

| Example | BA | MAA |
|---|---|---|
| 24 | 70 | 30 |
| 25 | 60 | 40 |
| 26 | 50 | 50 |
| 27 | 40 | 60 |

TABLE 11

Comparison varying MAA levels

| Example | Add-on (%) | Basis Weight (gsm) | Wet Tensile Strength (normalized to 112.5 gsm) | | | Wet Strength Index | |
|---|---|---|---|---|---|---|---|
| | | | 10% NaCl (gf/in) | 200 ppm (gf/in) | DI water (gf/in) | 10% NaCl | DI water |
| 24 | 12.5 | 101.5 | 920 | 1031 | 84 | 73.6 | 6.72 |
| 25 | 12.1 | 113.8 | 979 | 610 | 40 | 80.9 | 3.3 |
| 26 | 13.1 | 118.2 | 2053 | 981 | 185 | 156.7 | 14.1 |
| 27 | 12.5 | 109.3 | 2010 | 1386 | 270 | 160.8 | 21.6 |

Figure 4:
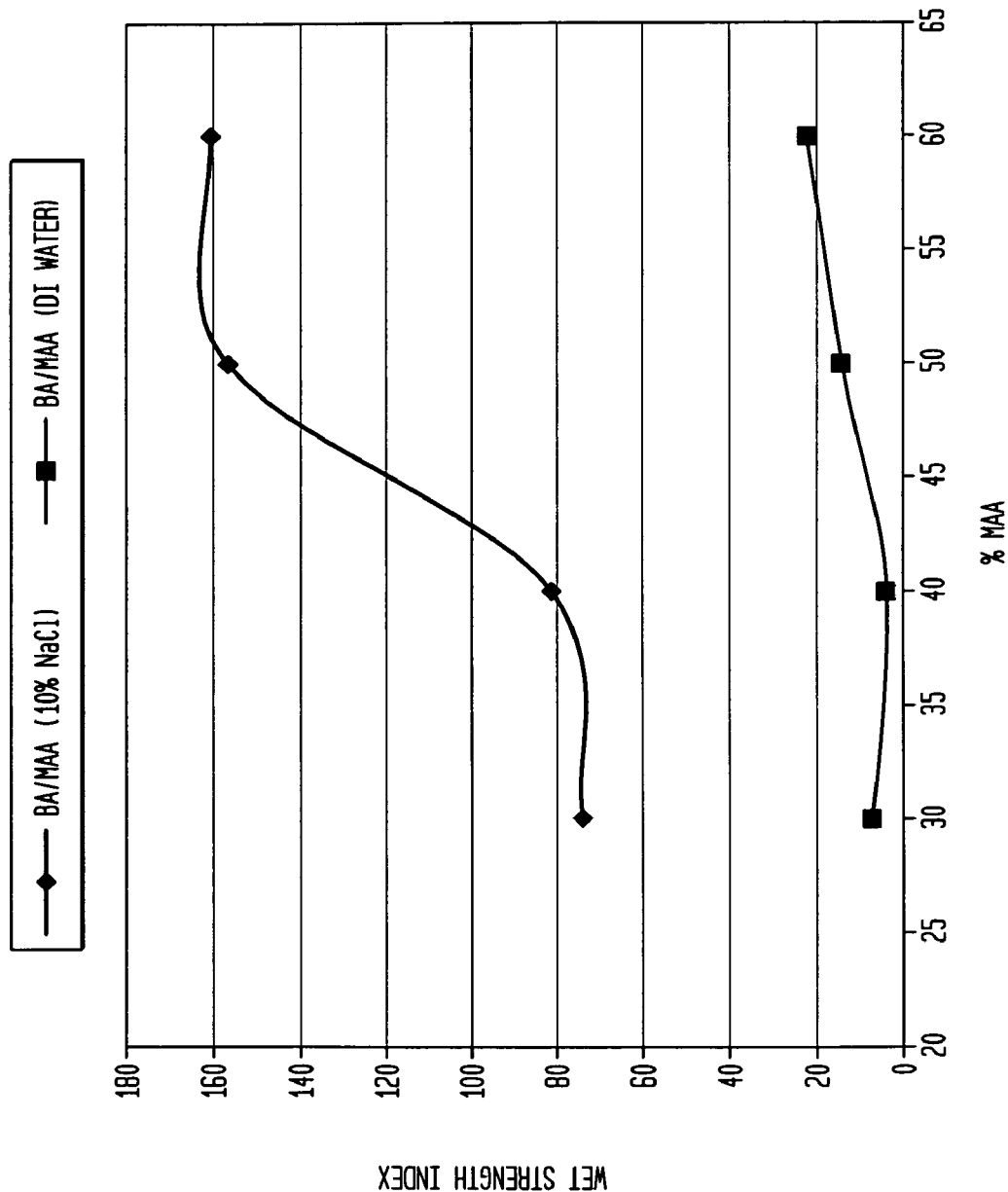
FIG. 4 is a graph of the wet strength indexes of Examples 22-25 plotted against the amount of acid monomer in the binder polymer.

The effect of the amount of methacrylic acid on the wet strength index is illustrated in FIG. 4. FIG. 4 shows that as the amount of methacrylic acid increases, the polymers generally provide a higher amount of wet-tensile strength in both concentrated salt solutions and DI water.

As discussed above, in preferred embodiments of the present invention the binder compositions contain a hydrophobic monomer in addition to the carboxylic acid and acrylate monomers. Examples 28-31 illustrate the effect of varying the amount and type of hydrophobic monomer in a binder having BA as an alkyl acrylate component and MAA as a carboxylic acid component.

TABLE 12

Composition of Examples 28-31

| Example | BA | tOA | nBMA | ibMA | MAA |
|---|---|---|---|---|---|
| 28 | 60 | — | — | — | 40 |
| 29 | 50 | 10 | — | — | 40 |
| 30 | 45 | — | 15 | — | 40 |
| 31 | 55 | — | — | 5 | 40 |

TABLE 13

Comparison of varying hydrophobic monomer

| Example | Add-on (%) | Basis Weight (gsm) | Wet Tensile Strength (normalized to 112.5 gsm) | | | Wet Strength Index | | |
|---|---|---|---|---|---|---|---|---|
| | | | 10% NaCl (gf/in) | 200 ppm (gf/in) | DI water (gf/in) | 10% NaCl | 200 ppm divalent cations | DI water |
| 28 | 13.8 | 117.1 | 1156 | 682 | 72 | 83.8 | 49.4 | 5.2 |
| 29 | 16.4 | 119.7 | 817 | 150 | 31 | 49.8 | 9.1 | 1.9 |
| 30 | 15.9 | 115.8 | 854 | 150 | 32 | 53.7 | 9.4 | 2.0 |
| 31 | 15.6 | 111.7 | 857 | 200 | 38 | 54.9 | 12.8 | 2.4 |

The wet strength values in Table 13 illustrate that the presence of a hydrophobic monomer can improve the salt-sensitive properties of the polymer for certain applications. For example it is seen that all of the binders in Examples 28-31 provide acceptable wet strength values in 10% NaCl and DI water. Furthermore, it is seen that in Examples 29-31, the webs have relatively low wet strengths in solutions having 200 ppm of divalent cations; the index elevation in the 200 ppm solution is no more than about 10.5 from that of DI water. Salt-sensitive properties of this type are particularly desirable for markets or applications where hard water dispersibility is required.

The binders in Examples 32-36, shown below, are polymerized into a stable emulsion using either a non-polymerizable, ether sulfate surfactant (ES-40) or a polymerizable surfactant monomer (BC 1025 or Trem LF-40). The amount of surfactant and chain transfer agent are reported as weight percent of the total non-surfactant monomer content.

TABLE 14

Composition of Examples 32-36

| Example | BA | MMA | MAA | (% Dodecyl mercaptan) | ES-40 | BC 1025 | Trem LF-40 |
|---|---|---|---|---|---|---|---|
| 32 | 43 | 44 | 13 | 1 | 1.6 | — | — |
| 33 | 43 | 44 | 13 | 1 | — | 2 | — |
| 34 | 60 | — | 40 | 0.5 | 1.6 | — | — |
| 35 | 60 | — | 40 | 0.5 | — | 2 | — |
| 36 | 60 | — | 40 | 0.5 | — | — | 1.6 |

TABLE 15

Strength values of Examples 32-36

| Example | Add-on (%) | Basis Weight (gsm) | Wet Tensile Strength (normalized to 112.5 gsm) | | | Wet Strength Index | |
|---|---|---|---|---|---|---|---|
| | | | 10% NaCl (gf/in) | 200 ppm (gf/in) | DI water (gf/in) | 10% NaCl | DI water |
| 32 | 12.9 | 99.0 | 305 | 243 | 25 | 23.6 | 1.9 |
| 33 | 12.3 | 99.5 | 629 | 612 | 53 | 51.1 | 4.3 |
| 34 | 12.8 | 101.8 | 1389 | 908 | 196 | 108.5 | 15.3 |
| 35 | 13.4 | 100.7 | 1207 | 573 | 104 | 90.1 | 7.8 |
| 36 | 12.5 | 95.9 | 1406 | 1149 | 161 | 112.5 | 12.9 |

As can be seen by Table 15, employing polymerizable emulsifiers produces binders with salt-sensitive characteristics that are equivalent to, if not superior to, non-polymerizable surfactants.

The above examples are intended to more fully explain the invention as defined by the claims, below. Many modifications and variations of this invention can be made without departing from its spirit and scope, as will be apparent to those skilled in the art. For example, increasing or decreasing the various monomer ratios can influence the tensile performance of a web, as can changing the level of neutralization. Other factors can also affect the dispersibility of a web such as the type of fibers, the structure of the substrate, and the amount of binder used. Of course, it will also be understood that the specific wet strength properties should vary depending on the desired application. The specific embodiments described herein are offered by way of example only, and the invention is to be limited only by the terms of the appended claims, along with the full scope of equivalents to which such claims are entitled.

In view of the foregoing discussion, relevant knowledge in the art and references discussed above in connection with the Background and Detailed Description, the disclosures of which are all incorporated herein by reference, further description is deemed unnecessary.

What is claimed is:

1. A method for producing a salt-sensitive polymeric binder solution for a nonwoven article, the method comprising the steps of:
   i) preparing an emulsion composition by emulsion-polymerizing in an aqueous medium a copolymer resin containing from about 5 to about 80 wt. percent of carboxylic acid monomer units and from about 10 to about 95 wt. percent of ethylenically unsaturated comonomer units;
   ii) converting the emulsion composition into a solution by neutralizing the copolymer resin with base until the resin is water soluble; and
   iii) controlling the viscosity of the solution to be less than about 2,000 cps at 23° C.

2. The method according to claim 1, further comprising the step of diluting the emulsion composition to a solids level of from 10% to 35% prior to neutralizing the copolymer resin.

3. The method according to claim 1, further comprising the step of diluting the emulsion composition to a solids level of from 15% to 25% solids prior to neutralizing the copolymer resin.

4. The method according to claim 1, wherein the viscosity of the solution is controlled to be less than about 1,000 cps at 23° C.

5. The method according to claim 1, wherein the viscosity of the solution is controlled to be less than about 500 cps at 23° C.

6. The method according to claim 1, wherein the viscosity of the solution is controlled to be less than about 200 cps at 23° C.

7. A method of making a nonwoven web with a polymeric binder, said method comprising the steps of:
   i) preparing an emulsion composition by emulsion-polymerizing in an aqueous medium a copolymer resin containing from about 5 to about 80 wt. percent of carboxylic acid units and from about 10 to about 95 wt. percent of ethylenically unsaturated comonomer units;
   ii) converting the emulsion composition to a binder solution by neutralizing the copolymer resin with base at least until it is water soluble;
   iii) providing a fibrous web; and
   iv) applying the binder solution to the fibrous web,
wherein the binder provides a characteristic wet strength index of less than 25 in deionized water and a characteristic wet strength index elevation of at least 15 points in a 10% aqueous solution of NaCl.

8. The method of claim 7, further comprising the step of drying the web.

9. The method according to claim 8, further comprising the step of contacting the nonwoven web with a wetting composition that includes at least 0.5 wt. percent of an inorganic salt.

10. The method according to claim 9, wherein the inorganic salt comprises sodium sulfate.

11. The method according to claim 7, further comprising the step of diluting the emulsion composition to a solids level of from 10% to 35% prior to neutralizing the copolymer resin.

12. The method according to claim 7, further comprising the step of diluting the emulsion composition to a solids level of from 15% to 25% solids prior to neutralizing the copolymer resin.

13. The method according to claim 7, wherein the viscosity of the binder solution is controlled to be less than about 2,000 cps at 23° C.

14. The method according to claim 7, wherein the viscosity of the binder solution is controlled to be less than about 1,000 cps at 23° C.

15. The method according to claim 7, wherein the viscosity of the binder solution is controlled to be less than about 500 cps at 23° C.

16. The method according to claim 7, wherein the viscosity of the binder solution is controlled to be less than about 200 cps at 23° C.

* * * * *